(12) United States Patent
Nguyen et al.

(10) Patent No.: US 11,725,112 B2
(45) Date of Patent: Aug. 15, 2023

(54) THREE-DIMENSIONAL PRINTED POROUS SILICONE MATRIX USING LEACHABLE POROGEN

(71) Applicant: Lawrence Livermore National Security, LLC, Livermore, CA (US)

(72) Inventors: Du Nguyen, Fremont, CA (US); Eric Duoss, Dublin, CA (US); Jeremy Lenhardt, Tracy, CA (US); Thomas S. Wilson, San Leandro, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 531 days.

(21) Appl. No.: 16/805,494

(22) Filed: Feb. 28, 2020

(65) Prior Publication Data

US 2021/0269659 A1 Sep. 2, 2021

(51) Int. Cl.
| | | |
|---|---|---|
| *C09D 11/102* | (2014.01) | |
| *C09D 11/037* | (2014.01) | |
| *B33Y 70/10* | (2020.01) | |
| *B29C 64/118* | (2017.01) | |
| *B29C 64/379* | (2017.01) | |
| *B33Y 40/20* | (2020.01) | |
| *B33Y 70/00* | (2020.01) | |
| *B33Y 10/00* | (2015.01) | |

(Continued)

(52) U.S. Cl.
CPC .......... *C09D 11/102* (2013.01); *B29C 64/118* (2017.08); *B29C 64/379* (2017.08); *B33Y 10/00* (2014.12); *B33Y 40/20* (2020.01); *B33Y 70/00* (2014.12); *B33Y 70/10* (2020.01); *C09D 11/037* (2013.01); *B29C 71/00* (2013.01); *B29C 2071/0027* (2013.01); *B29K 2083/00* (2013.01); *B29K 2439/06* (2013.01)

(58) Field of Classification Search
CPC ..... B29C 64/118; B29C 64/30; B29C 64/379; B29C 71/00; B29C 2071/0027; B33Y 10/00; B33Y 40/20; B33Y 80/00
See application file for complete search history.

(56) References Cited

U.S. PATENT DOCUMENTS

| | | | | |
|---|---|---|---|---|
| 5,376,117 A | * | 12/1994 | Pinchuk | ................. B29C 41/20 623/8 |
| 2011/0293667 A1 | * | 12/2011 | Baksh | ..................... A61P 19/08 435/69.1 |

OTHER PUBLICATIONS

Mazurek et al., "Green silicone elastomer obtained from a counterintuitively stable mixture of glycerol and PDMS," Polymer, vol. 87, Jan. 28, 2016, pp. 1-7.

(Continued)

*Primary Examiner* — Nahida Sultana
(74) *Attorney, Agent, or Firm* — Zilka-Kotab, P.C.

(57) ABSTRACT

The silicone-based ink for additive manufacturing includes a siloxane macromer, and a porogen mixture comprising a water-soluble porogen and a surfactant. The product of additive manufacturing with a silicone-based ink includes a three-dimensional printed structure including a plurality of continuous filaments arranged in a predefined pattern and a plurality of inter-filament pores defined by the predefined pattern of the continuous filaments. In addition, each continuous filament of the three-dimensional printed structure includes a silicone matrix having an open cell structure with a plurality of intra-filament pores, and the intra-filament pores form continuous channels through the silicone matrix.

22 Claims, 22 Drawing Sheets

(51) Int. Cl.
   *B29K 83/00*  (2006.01)
   *B29C 71/00*  (2006.01)

(56) References Cited

OTHER PUBLICATIONS

Zhao et al., "Preparation of Microporous Silicone Rubber Membrane with Tunable Pore Size via Solvent Evaporation-Induced Phase Separation," ACS Applied Materials & Interfaces, vol. 5, 2013, pp. 2040-2046.

Butler et al., "Emulsion Templating Using High Internal Phase Supercritical Fluid Emulsions," Advanced Materials, vol. 13, No. 19, Oct. 2, 2001, pp. 1459-1463.

Fawcett et al., "Silicone foams stabilized by surfactants generated in situ from allyl-functionalized PEG," Soft Matter, vol. 6, Jan. 18, 2010, pp. 1229-1237.

Maiti et al., "3D printed cellular solid outperforms traditional stochastic foam in long-term mechanical response," Scientific Reports, vol. 6:24871, Apr. 27, 2016, pp. 1-8.

* cited by examiner

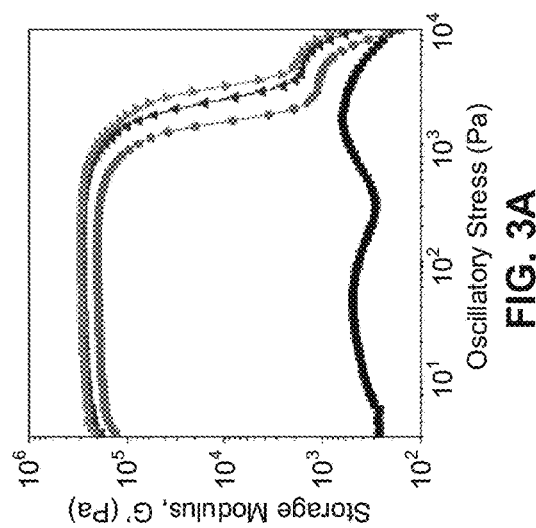
FIG. 3A
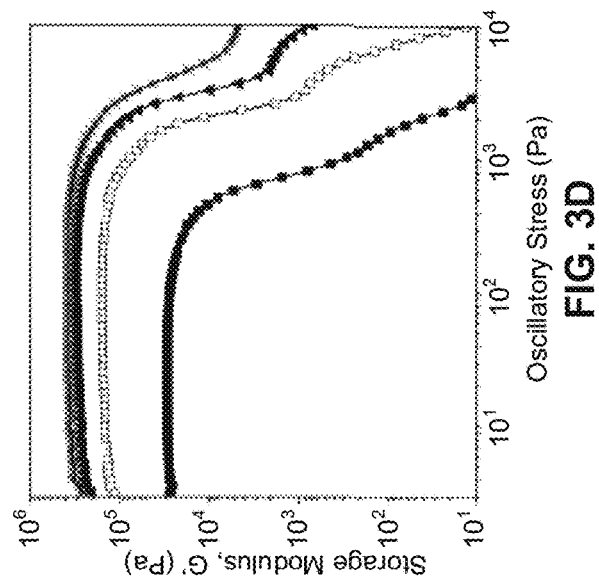
FIG. 3D
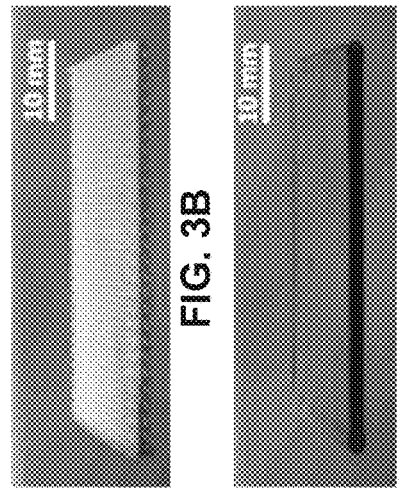
FIG. 3B
FIG. 3C

FIG. 8A
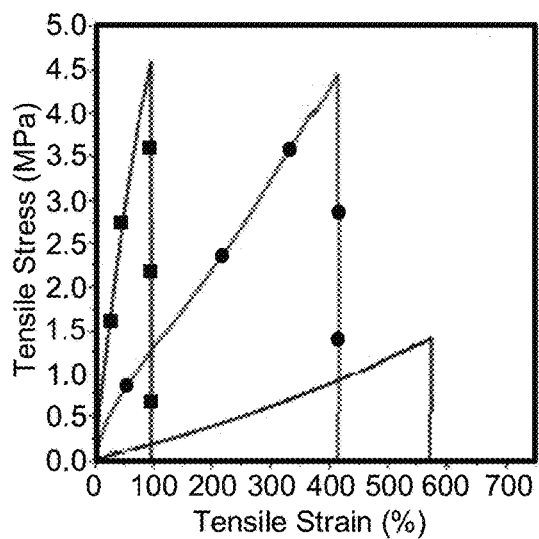
FIG. 8B
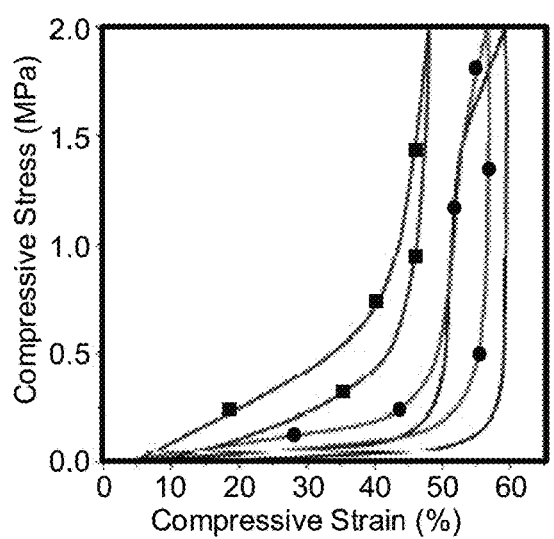
FIG. 8C
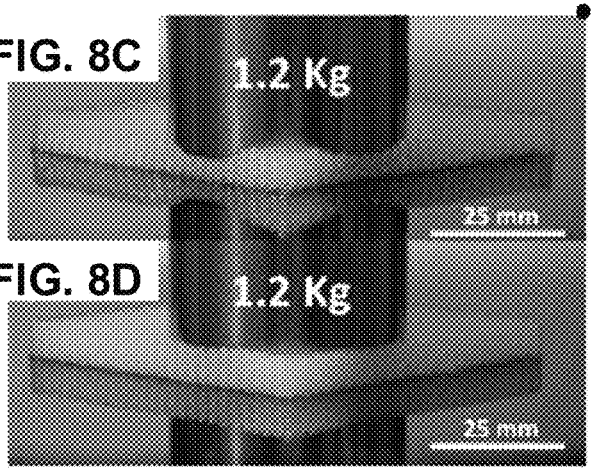
FIG. 8D
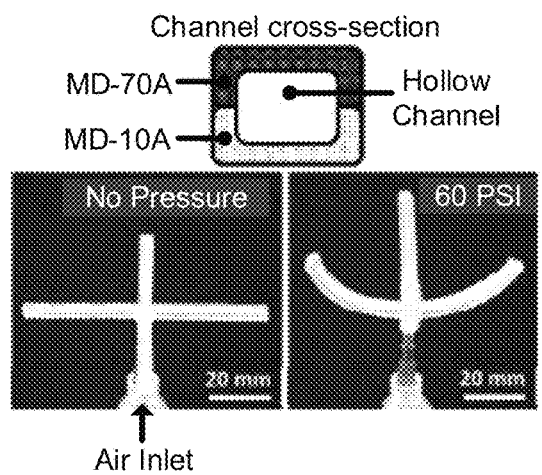
FIG. 8E

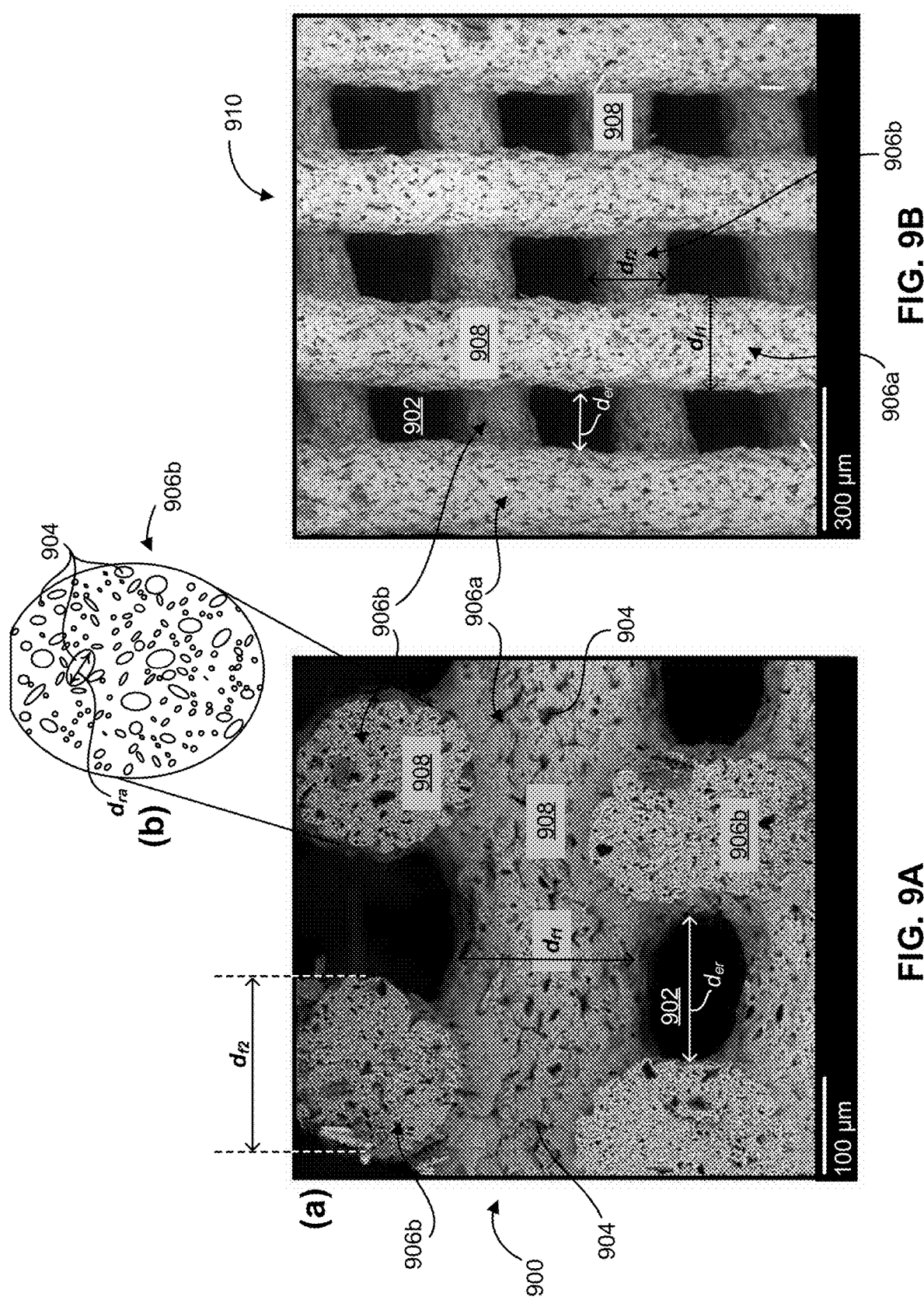

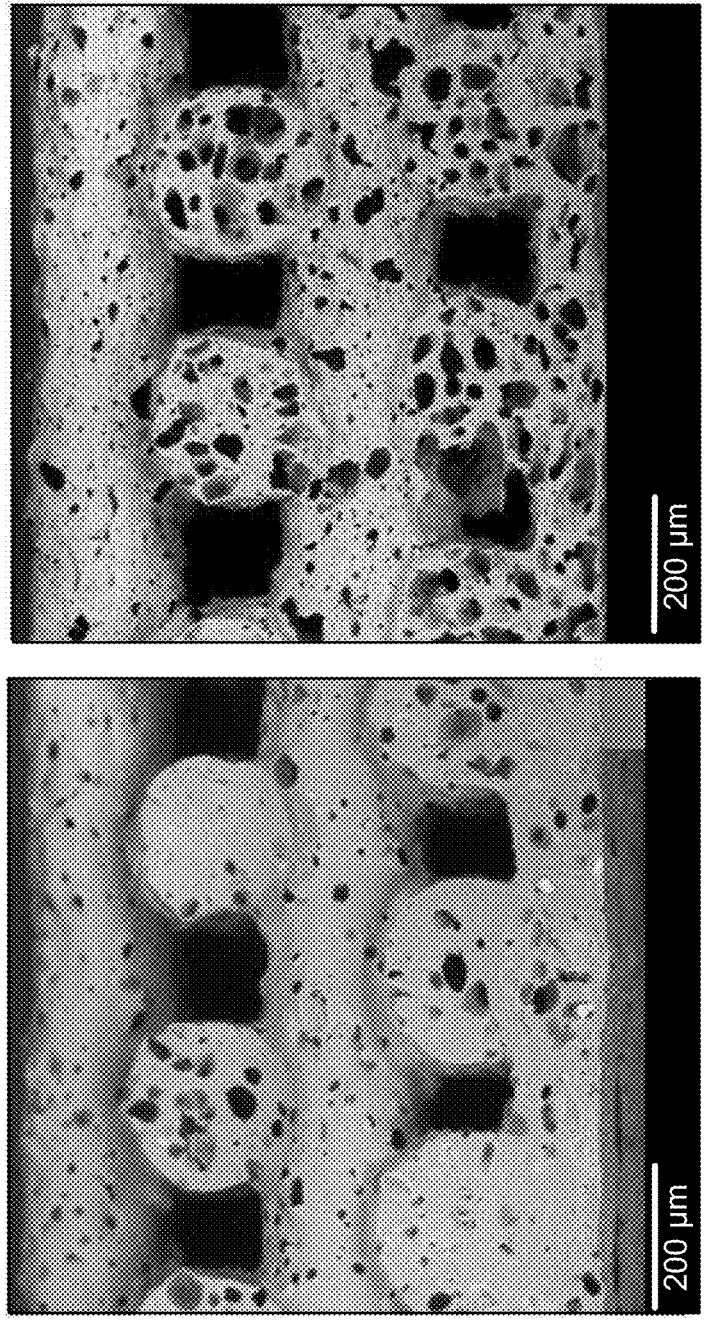

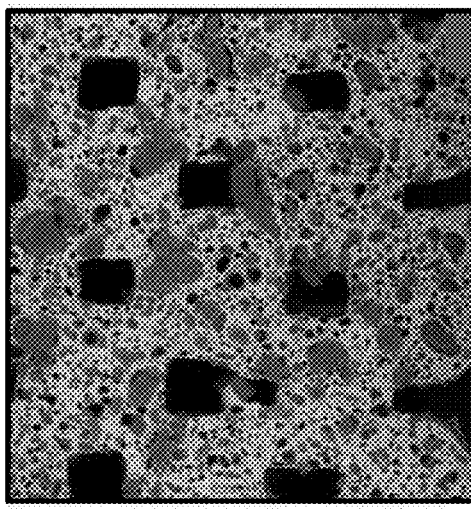 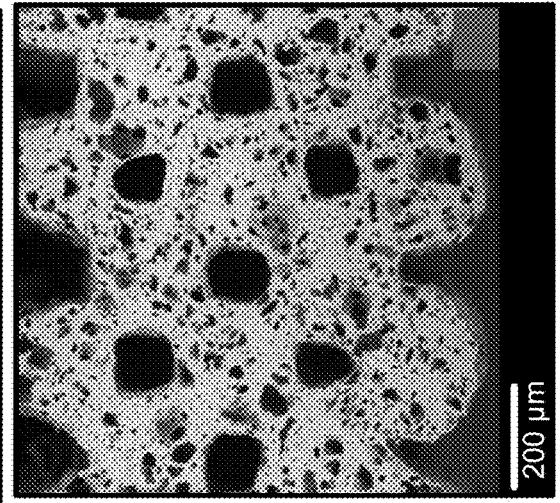
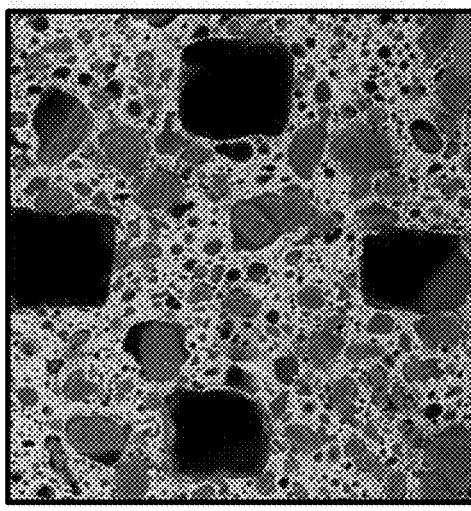 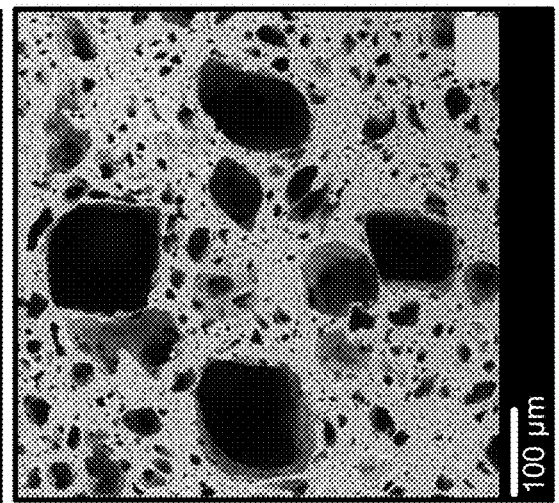
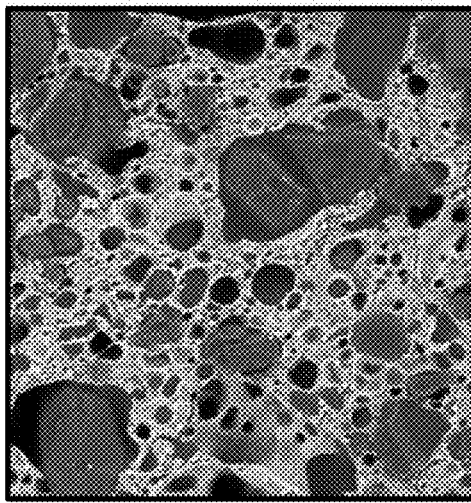 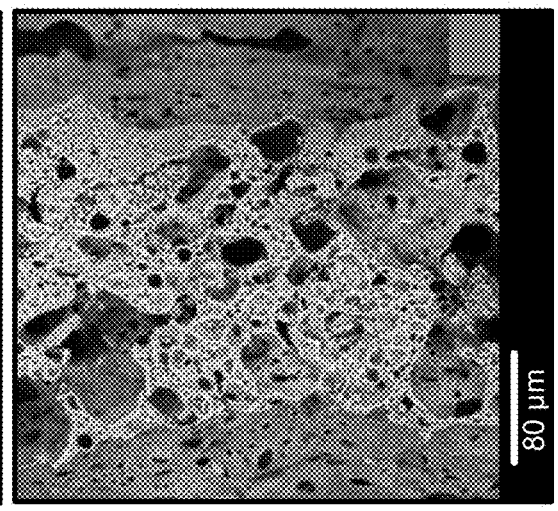

FIG. 22A
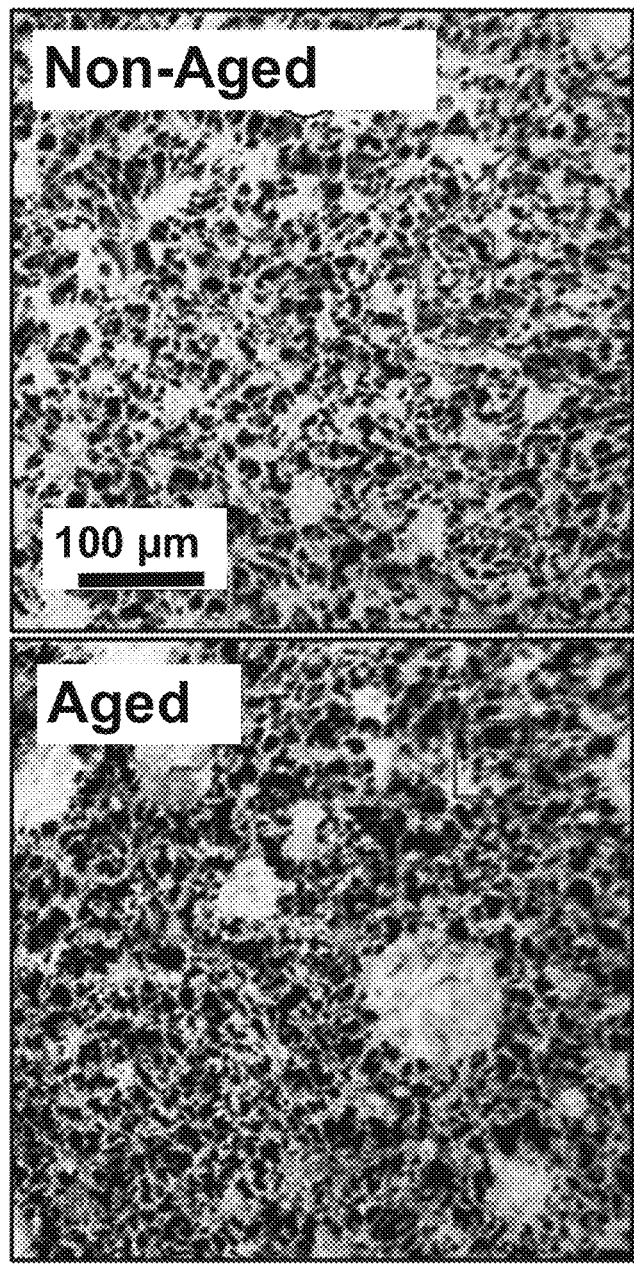
FIG. 22C
FIG. 22B
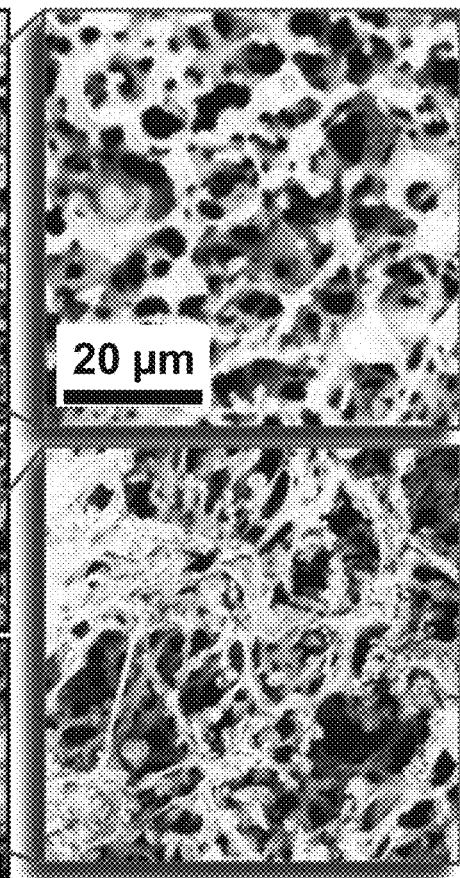
FIG. 22D
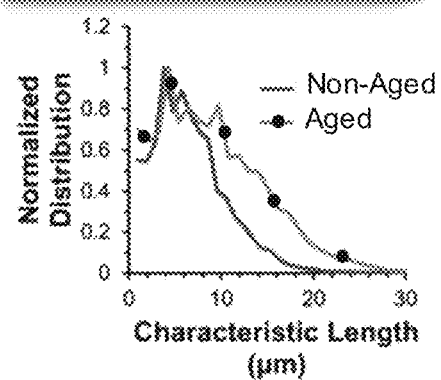
FIG. 22E

THREE-DIMENSIONAL PRINTED POROUS SILICONE MATRIX USING LEACHABLE POROGEN

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to additive manufacturing of silicone materials, and more particularly, this invention relates to silicone-based inks having a leachable glycerol mixture for additive manufacturing and additive manufacturing processes using such inks.

BACKGROUND

The ability to introduce voids into polymers to produce porous structures has long been used to create foams with numerous applications. With the advent of additive manufacturing (AM), new ways to create this porosity that are compatible with AM techniques are necessary to create next generation high performance foams. In particular, direct ink writing (DIW) can be used which is a micro-extrusion technique wherein a printable ink is deposited in a layer-by-layer fashion to build up an object. DIW has been used previously to create cellular solids, however, the densities of the foams are higher than conventional stochastic foams. In contrast to the DIW foams with deterministic porosity, stochastic foams with micro-porosity can be formed with a variety of techniques such as gas foaming, emulsion templating, or the use of leachable additives.

The flowable nature of liquid silicone materials suggests that silicone material may be used in a DIW process of AM; however, the formation of three-dimensional (3D) structures that retain their shape has remained elusive. On the other hand, solid silicone material cannot be used as ink in AM because it is unflowable and cannot be extruded from the nozzle during printing. Thus, it would be desirable to create inks for additive manufacturing to form 3D printed parts of silicone material that retain the 3D shape. Moreover, it would be desirable to incorporate porosity within the printed strands of 3D printed structures, and thus, the overall structure (e.g., part) porosity, as compared to outer structural dimensions of non-porous 3D printed material, may be increased.

SUMMARY

In one embodiment, a silicone-based ink for additive manufacturing includes a siloxane macromer, and a porogen mixture comprising a water-soluble porogen and a surfactant.

In another embodiment, a product of additive manufacturing with a silicone-based ink includes a three-dimensional printed structure including a plurality of continuous filaments arranged in a predefined pattern and a plurality of inter-filament pores defined by the predefined pattern of the continuous filaments. In addition, each continuous filament includes a silicone matrix having an open cell structure with a plurality of intra-filament pores, and the intra-filament pores form continuous channels through the silicone matrix.

In yet another embodiment, a method of forming a three-dimensional structure having a porous silicone matrix includes forming the three-dimensional structure using a siloxane mixture comprising a siloxane macromer and a porogen mixture, curing the formed three-dimensional structure to at least a predefined extent to form a silicone matrix, and leaching the porogen mixture from the silicone matrix to result in a plurality of pores forming interconnected channels through the silicone matrix of the three-dimensional structure. The porogen mixture includes glycerol and polyvinyl pyrrolidone.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 3A is a plot of oscillatory stress of storage modulus values for silicone-based inks, according to various embodiments.

FIG. 3B is a lattice 8-layer structure formed by a silicone-based ink with rheological additive, according to one embodiment.

FIG. 3C is a lattice 8-layer structure formed by a silicone-based ink without rheological additive, according to one embodiment.

FIG. 3D is a plot of the effect of treated reinforcing silica filler on observed yield stress, according to various embodiments.

FIG. 8A is a plot of tensile stress versus tensile strain, according to various embodiments.

FIG. 8B is a plot of compressive performance, according to various embodiments.

FIGS. 8C and 8D are images of a physical demonstration of stiffness of 3D printed silicone-based lattices, according to various embodiments.

FIG. 8E is a diagram of a 3D-printed air-driven soft robotic actuator, according to one embodiment.

Part (a) of FIG. 9A is a scanning electron microscopy image of a cross-section of a three-dimensional printed porous siloxane structure, according to one embodiment.

Part (b) of FIG. 9A is a drawing of a cross-section of a filament shown in part (a).

FIG. 9B is a scanning electron microscopy image of a top view of a three-dimensional printed porous siloxane structure, according to one embodiment.

Figure 10:
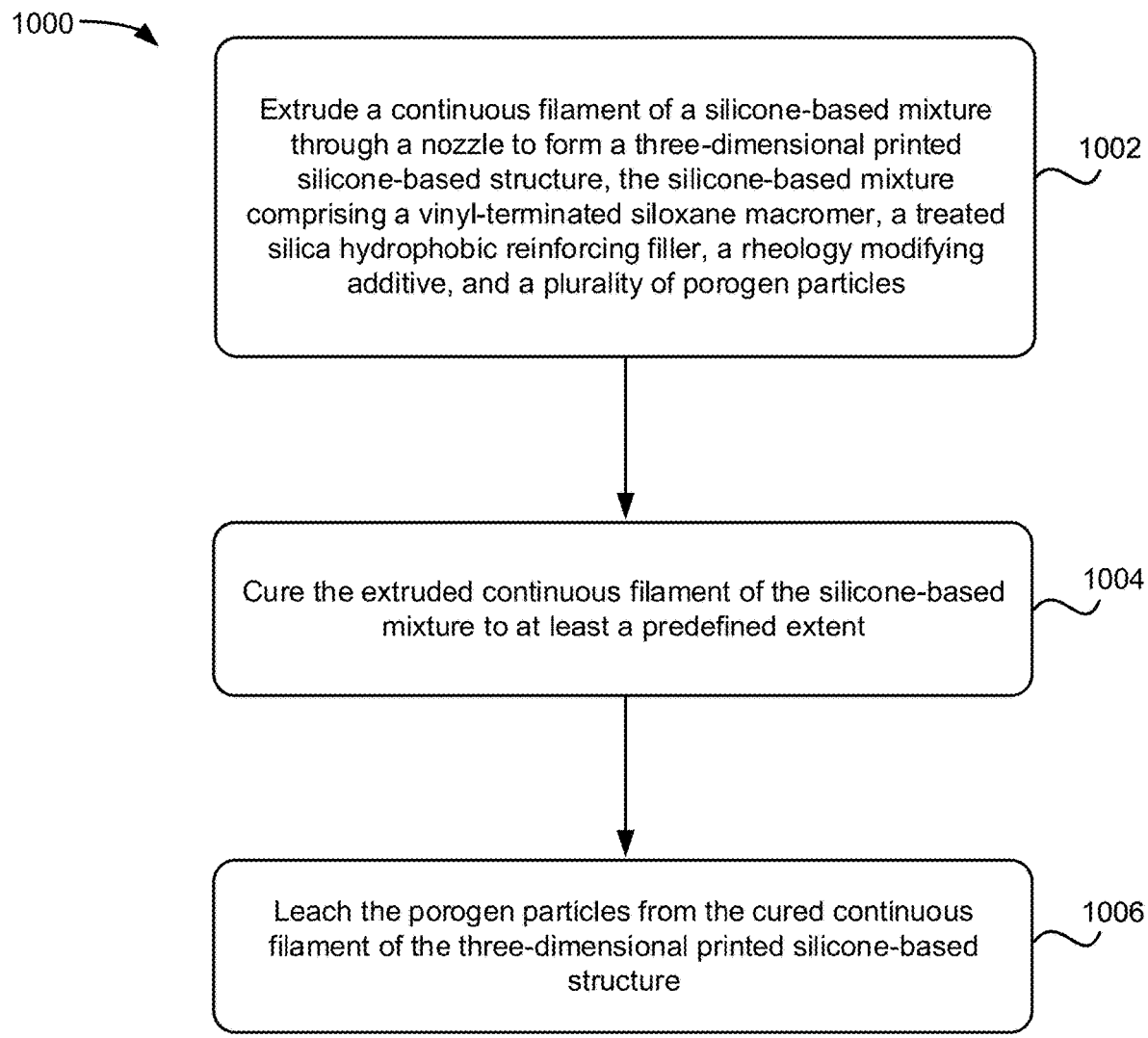

FIG. 10 is a flow chart of a method, according to one embodiment.

Figure 11:
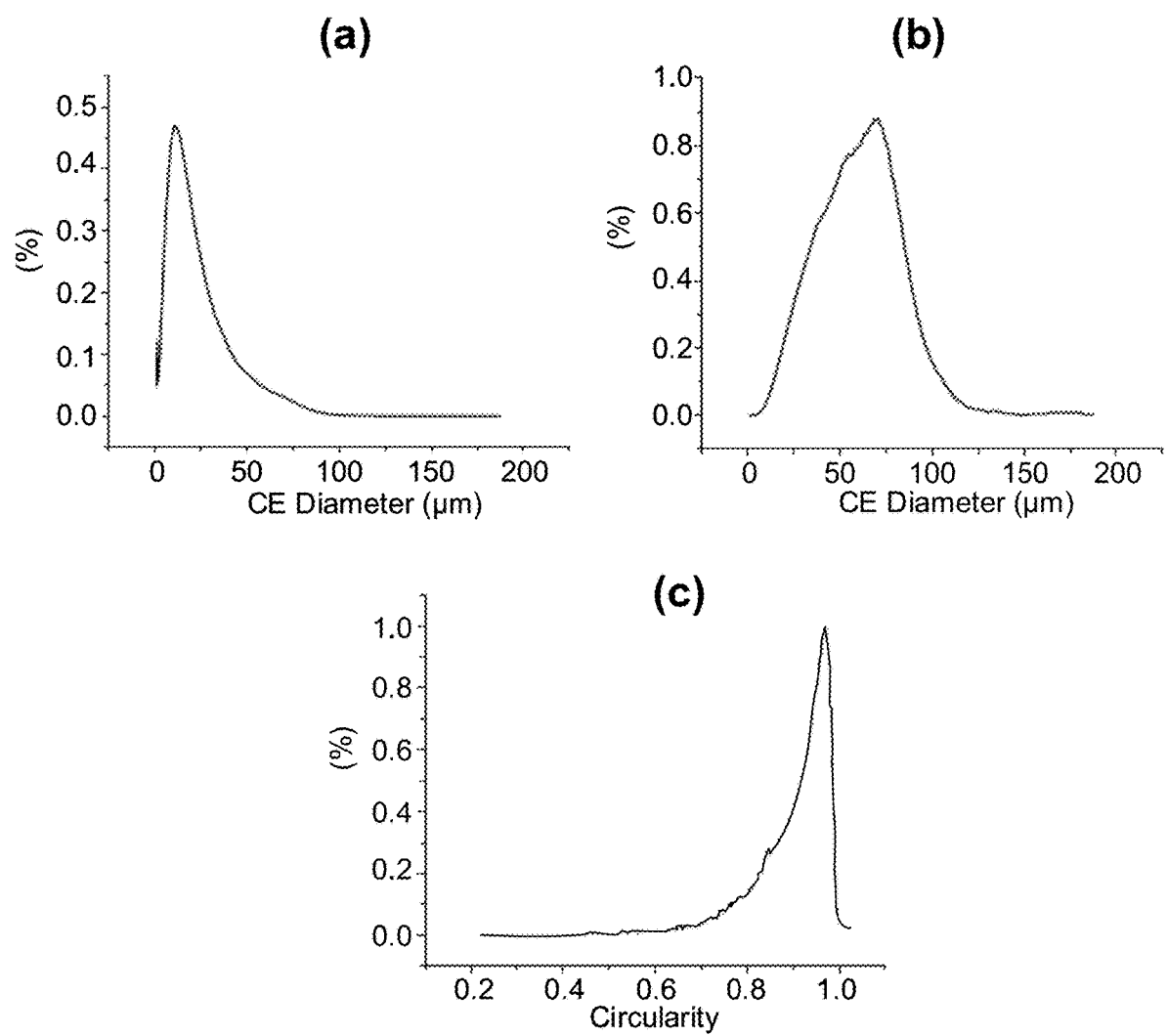

FIG. 11 are plots of various characteristics to sieved urea particles, according to various approaches. Part (a) depicts a plot of the number distribution of sieved urea particles according to mean circle equivalent (CE) diameter. Part (b)

depicts a plot of volume distribution (D[4,3]) according to mean CE diameter. Part (c) depicts the circularity of the population of sieved urea particles.

Figure 12:
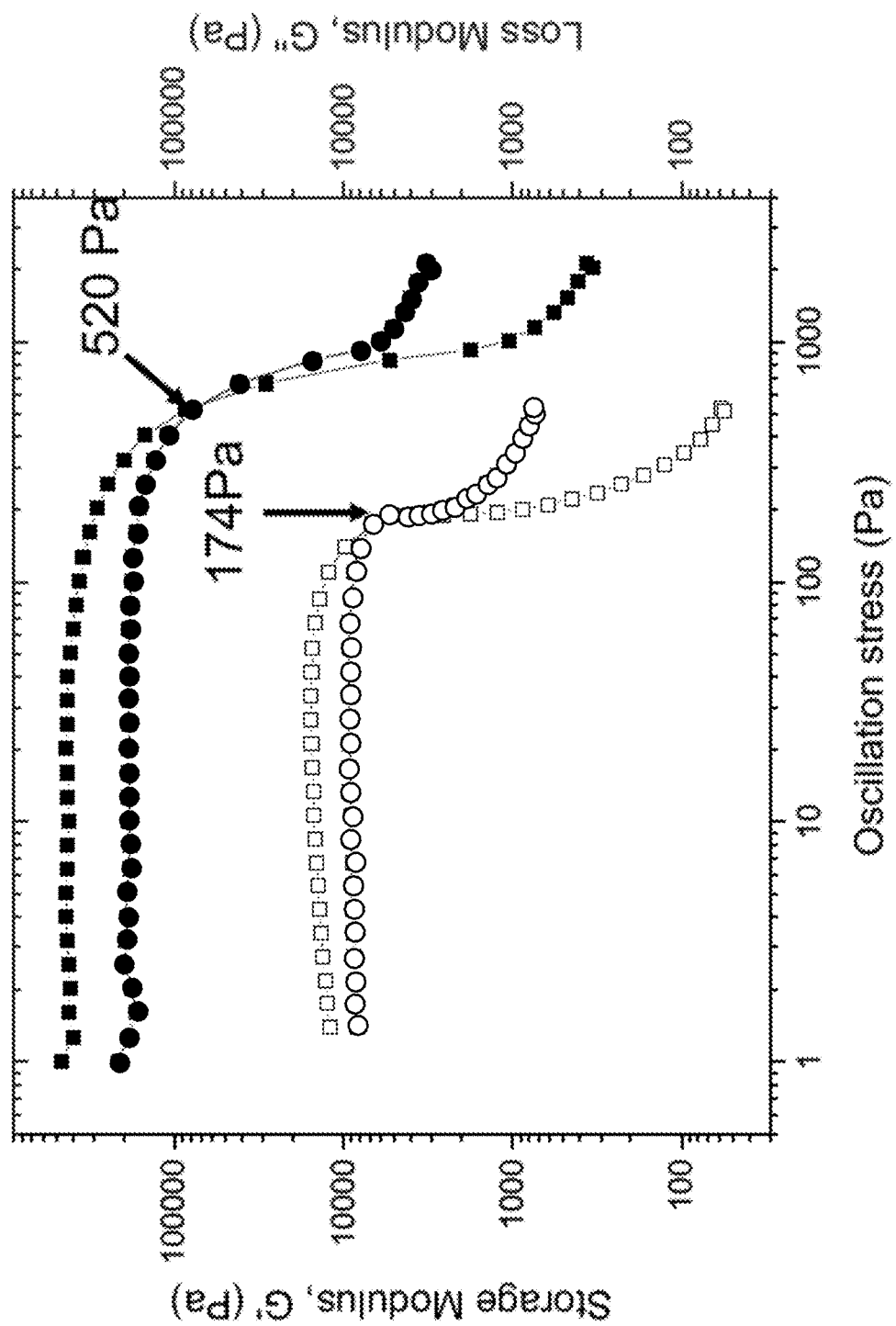

FIG. 12 is a plot of storage modulus and loss modulus of various siloxane resins, according to one embodiment.

Figure 13B:
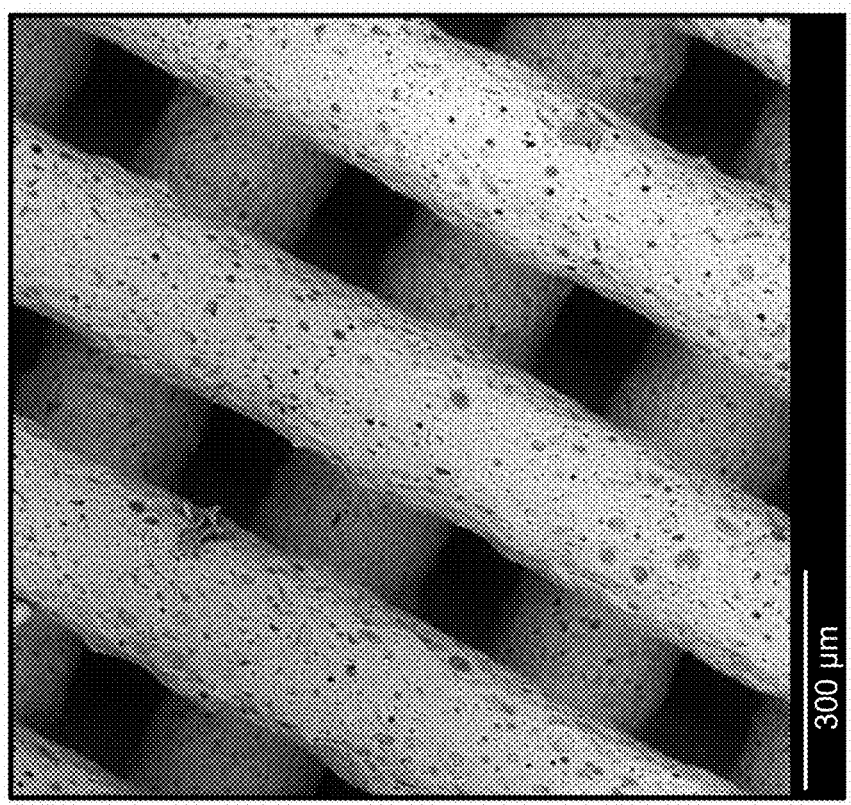
Figure 13A:
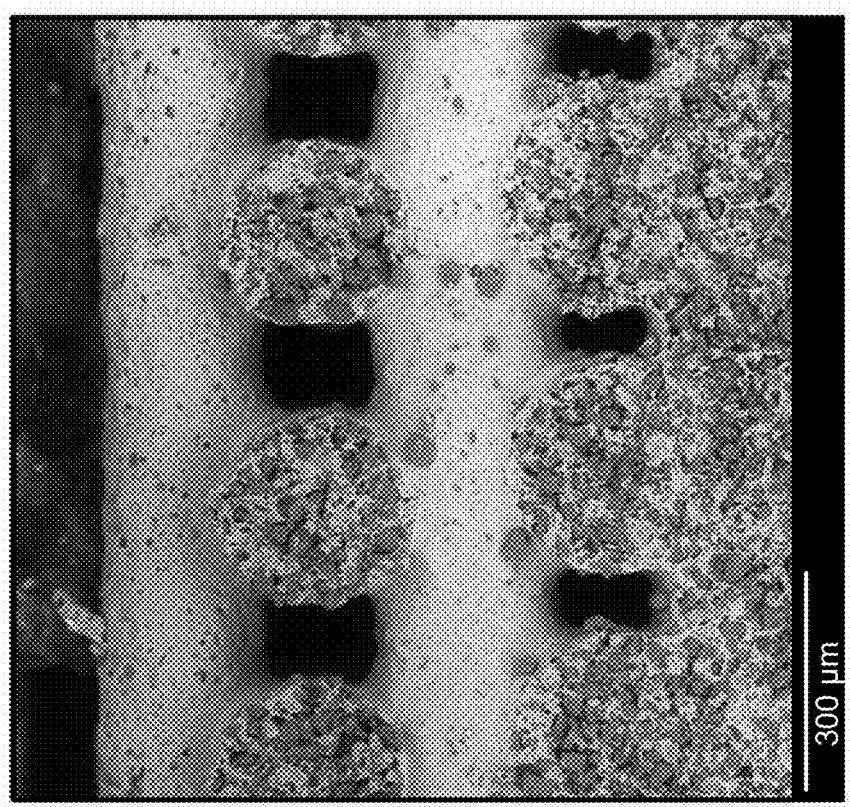

FIG. 13A is scanning electron microscopy image of a cross-section of a three-dimensional printed part using siloxane resin with urea particles, according to one embodiment.

FIG. 13B is a scanning electron microscopy image of a top view of a three-dimensional printed part using siloxane resin with urea particles, according to one embodiment.

FIG. 14A is a scanning electron microscopy image of a porous 3D siloxane structure printed with siloxane ink having 25 volume % porogen particles, according to one embodiment.

FIG. 14B is a scanning electron microscopy image of a porous 3D siloxane structure printed with siloxane ink having 70 volume % porogen particles, according to one embodiment.

Figure 15B:
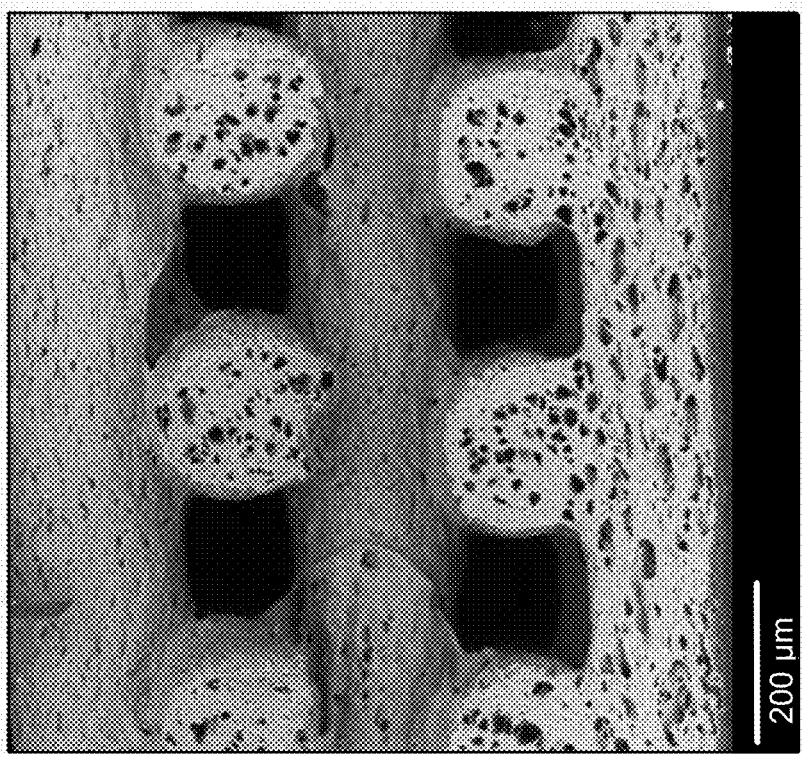
Figure 15A:
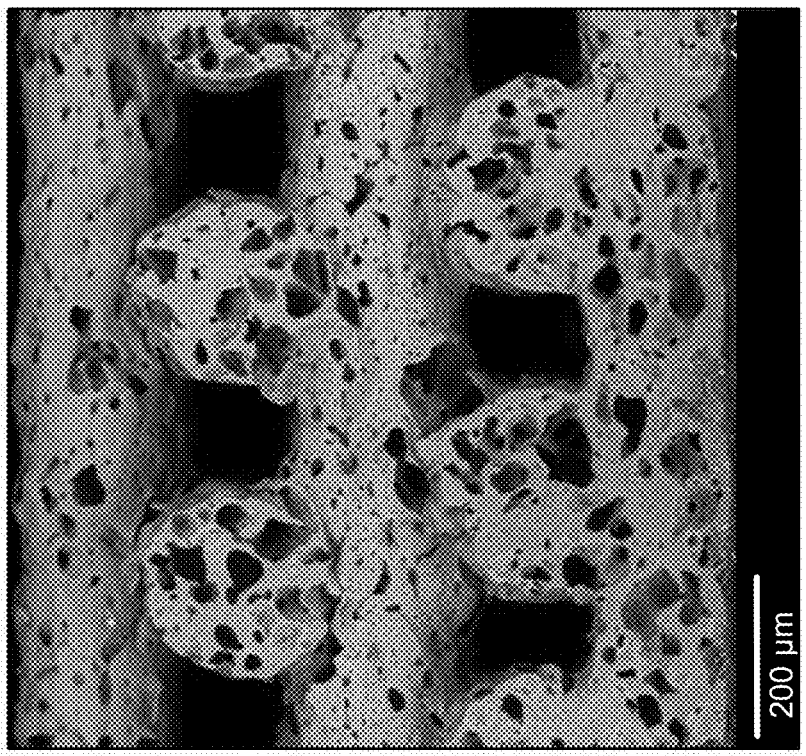

FIG. 15A is a scanning electron microscopy image of a porous 3D siloxane structure printed with siloxane ink having spherical porogen particles, according to one embodiment.

FIG. 15B is a scanning electron microscopy image of a porous 3D siloxane structure printed with siloxane ink having small, elongated porogen particles, according to one embodiment.

Figure 16:
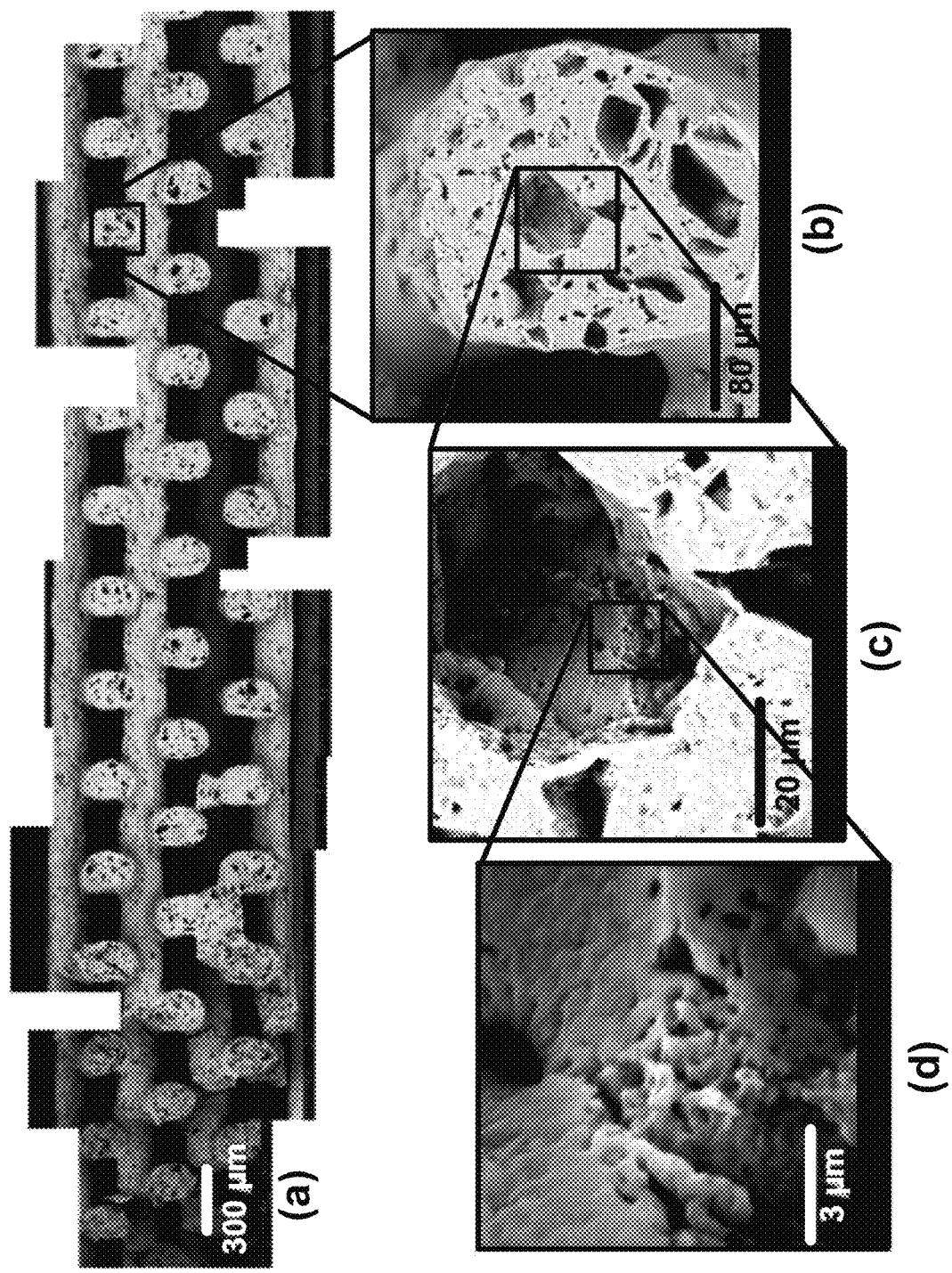

FIG. 16 is a series of scanning electron microscopy images of a porous 3D siloxane structure printed with siloxane ink having sugar particles as porogen particles, according to one embodiment. Part (a) is an image of the 3D printed structure. Part (b) is a magnified view of a filament in the image of part (a). Part (c) is an image of a magnified view of a pore of the filament in the image of part (b). Part (d) is a magnified view of inside the pore in the image of part (c).

Figure 17:
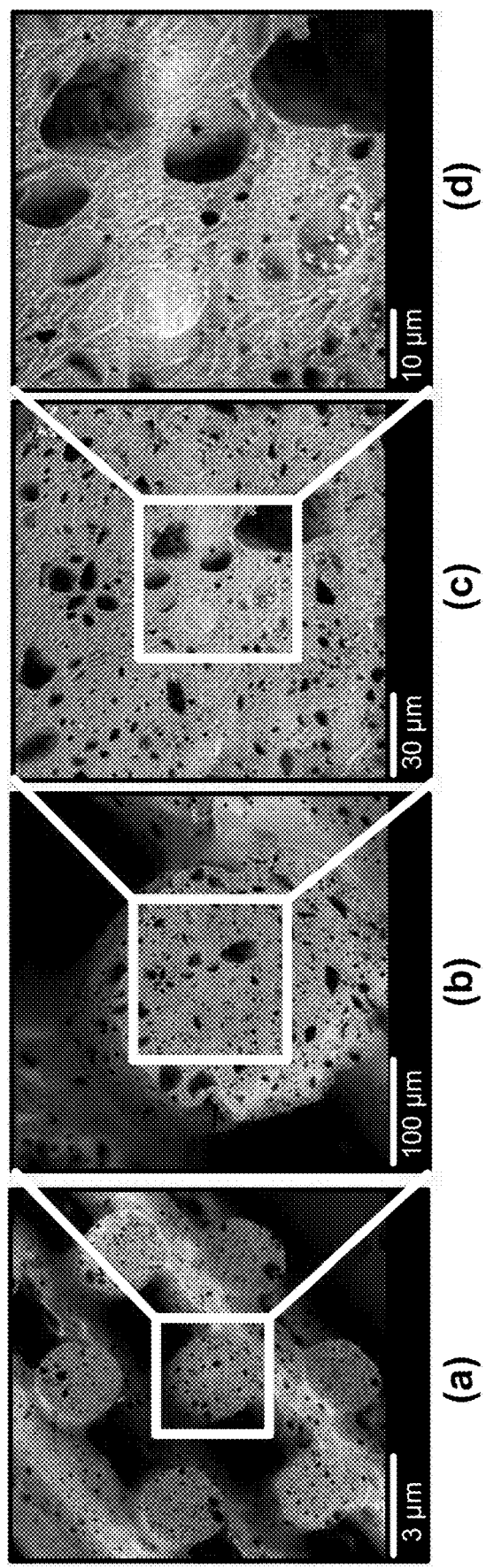

FIG. 17 is a series of scanning electron microscopy images of a porous 3D siloxane structure printed with siloxane ink having polyethylene glycol (PEG) as porogen particles, according to one embodiment. Part (a) is an image of the 3D printed structure. Part (b) is a magnified view of a filament in the image of part (a). Part (c) is an image of a magnified view of a portion of the filament in the image of part (b). Part (d) is a magnified view of portion of the image of part (c).

FIGS. 18A-18C are a series of scanning electron images at different magnifications of a silicone-based 3D printed structure formed by DIW with a silicone-based ink having a mixture of urea particles and glycerol used as porogen particles, according to one approach.

FIGS. 18D-18F are a series of scanning electron images at different magnifications of a silicone-based 3D printed structure as shown in FIGS. 18A-18C after removing the porogen particles, according to one approach.

Figure 19:
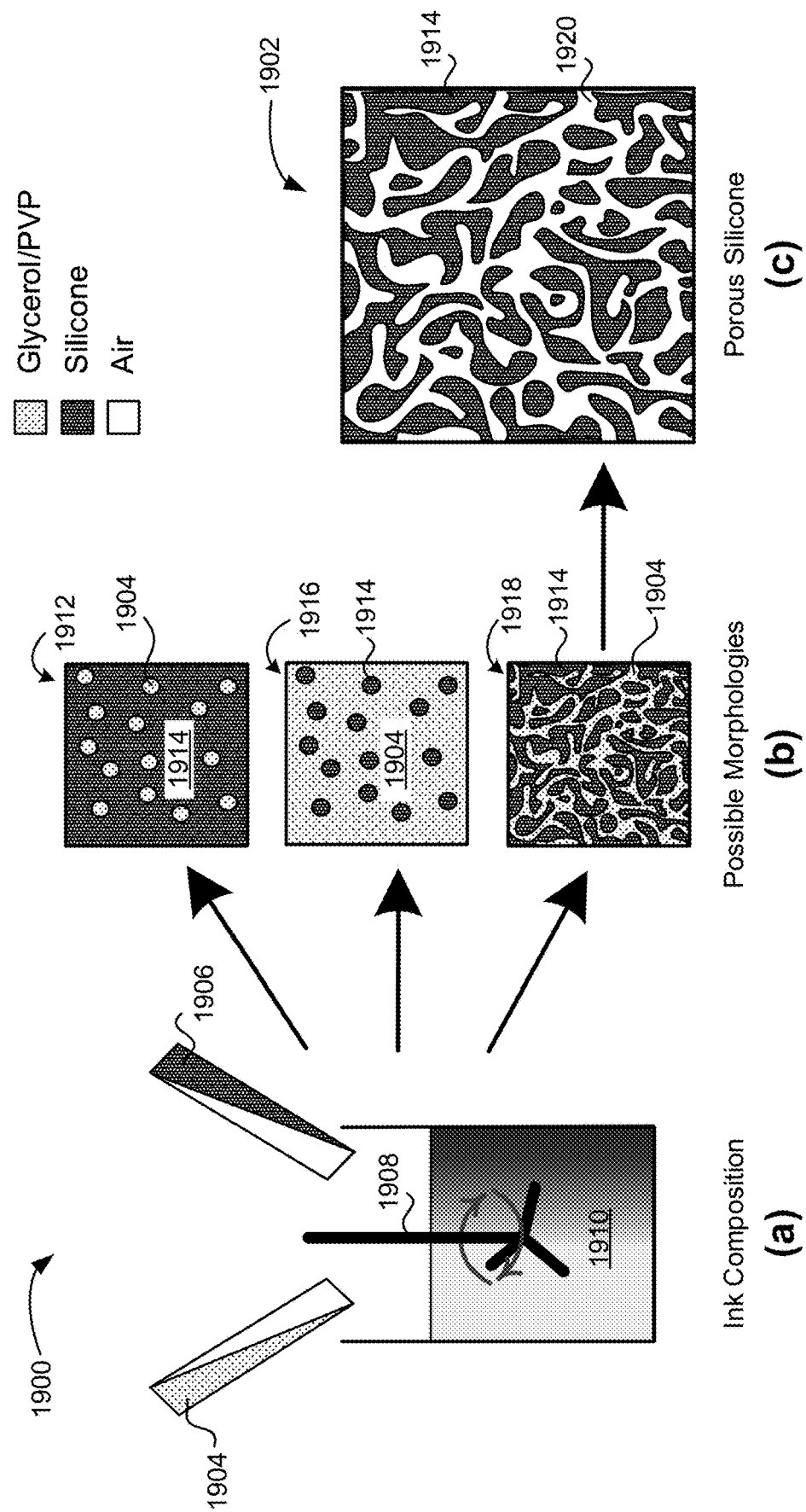

FIG. 19 is a schematic drawing of a method of forming a porous silicone, according to one embodiment. Part (a) is a drawing of an ink composition, part (b) are drawings of possible morphologies formed after curing the ink composition, and part (c) is a drawing of a porous silicone structure.

Figure 20:
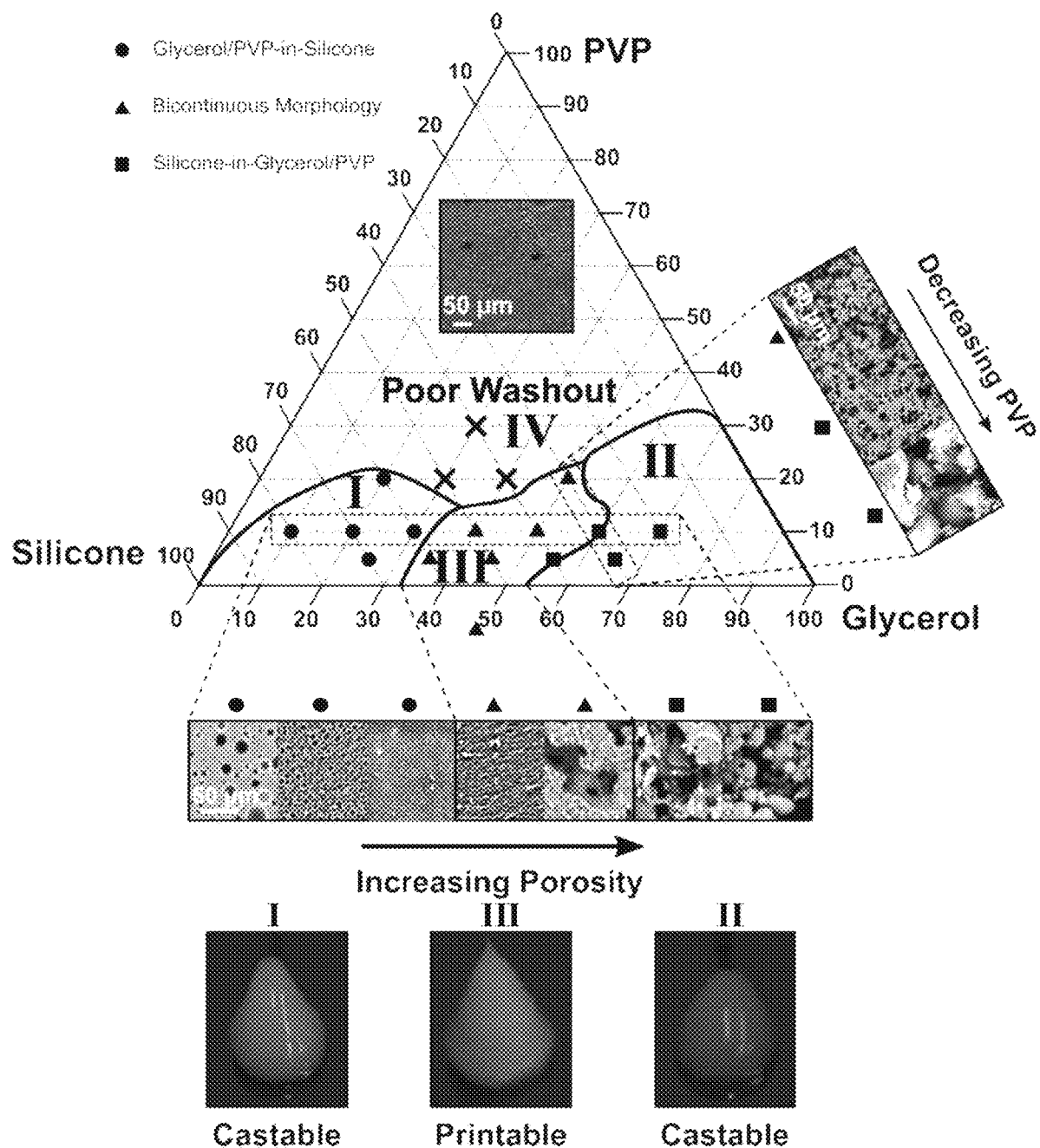

FIG. 20 is a schematic diagram of a Ternary Diagram of components of a siloxane mixture for forming a porous silicone structure, according to one embodiment.

Figure 21:
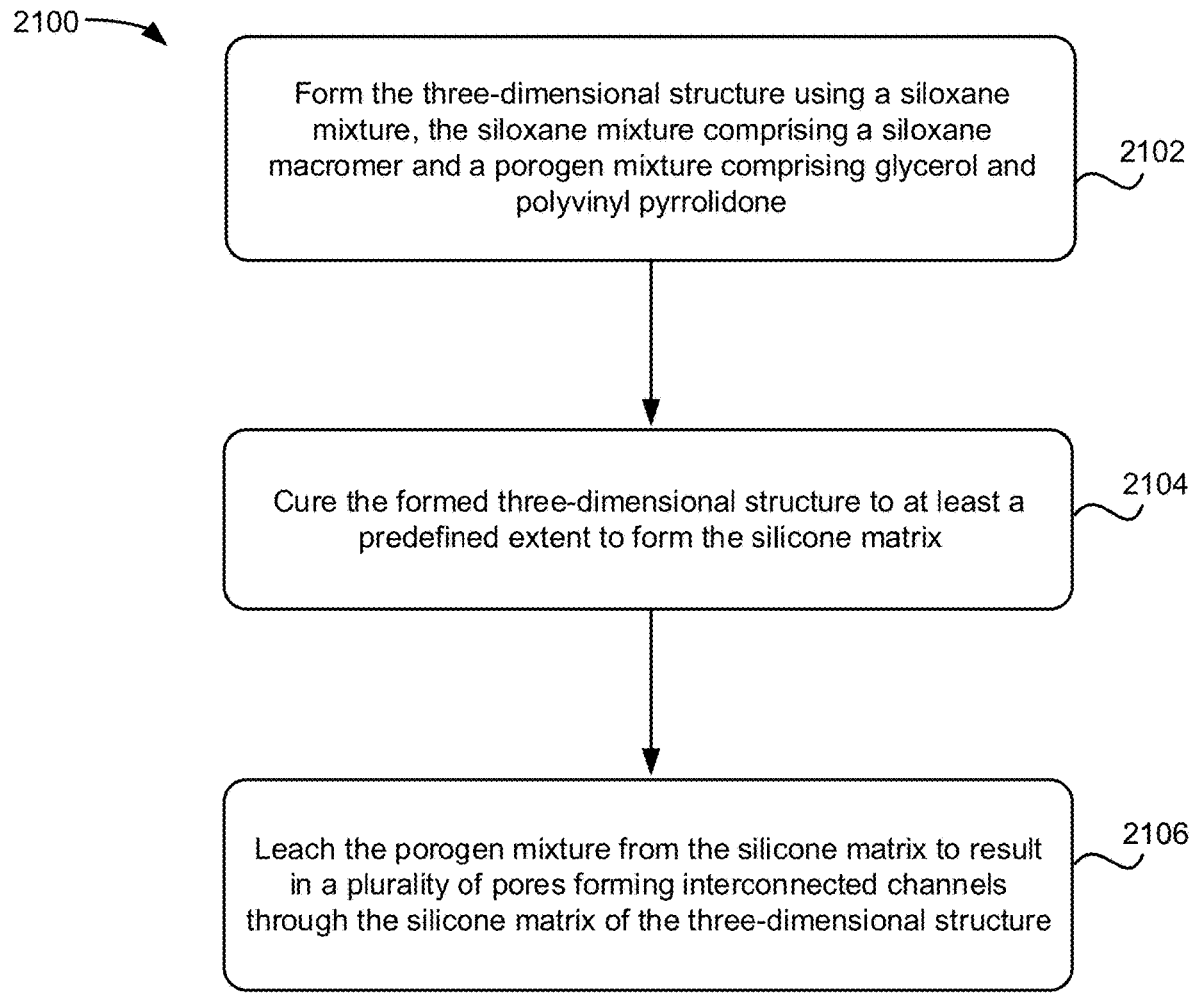

FIG. 21 is a flow chart of a method for forming a porous silicone structure, according to one embodiment.

FIG. 22A is a scanning electron micrograph image of a porous silicone matrix prior to drying, a "Non-Aged" sample, according to one embodiment.

FIG. 22B is a magnified view of a portion of the image of FIG. 22A.

FIG. 22C is a scanning electron micrograph image of a porous silicone matrix after drying, an "Aged" sample, according to one embodiment.

FIG. 22D is a magnified view of a portion of the image of FIG. 22C.

FIG. 22E is a plot of the normalized distribution of characteristic pore lengths in the samples of images in FIG. 22A and FIG. 22C.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As also used herein, the term "about" denotes an interval of accuracy that, ensures the technical effect of the feature in question. In various approaches, the term "about" when combined with a value, refers to plus and minus 10% of the reference value. For example, a thickness of about 10 nm refers to a thickness of 10 nm±1 nm, a temperature of about 50° C. refers to a temperature of 50° C.±5° C., etc.

It is also noted that, as used in the specification and the appended claims, wt % is defined as the percentage of weight of a particular component is to the total weight/mass of the mixture. Vol % is defined as the percentage of volume of a particular compound to the total volume of the mixture or compound. Mol % is defined as the percentage of moles of a particular component to the total moles of the mixture or compound. Atomic % (at %) is defined as a percentage of one type of atom relative to the total number of atoms of a compound.

Unless expressly defined otherwise herein, each component listed in a particular approach may be present in an effective amount. An effective amount of a component means that enough of the component is present to result in a discernable change in a target characteristic of the ink, printed structure, and/or final product in which the component is present, and preferably results in a change of the characteristic to within a desired range. One skilled in the art, now armed with the teachings herein, would be able to readily determine an effective amount of a particular component without having to resort to undue experimentation.

The present disclosure includes several descriptions of exemplary "inks" used in an additive manufacturing process to form the inventive optics described herein. It should be understood that "inks" (and singular forms thereof) may be used interchangeably and refer to a composition of matter comprising a plurality of particles coated with/dispersed throughout a liquid phase such that the composition of matter may be "written," extruded, printed, or otherwise deposited to form a layer that substantially retains its asdeposited geometry and shape without excessive sagging, slumping, or other deformation, even when deposited onto other layers of ink, and/or when other layers of ink are deposited onto the layer. As such, skilled artisans will understand the presently described inks to exhibit appropriate rheological properties to allow the formation of monolithic structures via deposition of multiple layers of the ink (or in some cases multiple inks with different compositions) in sequence.

The following description discloses several preferred structures formed via direct ink writing (DIW), extrusion freeform fabrication, or other equivalent techniques and therefore exhibit unique structural and compositional characteristics conveyed via the precise control allowed by such techniques.

The following description discloses several preferred embodiments of silicone-based formulations for forming three-dimensional parts with intra-filament porosity and/or related systems and methods.

In one general embodiment, a silicone-based ink for additive manufacturing includes a siloxane macromer, and a porogen mixture comprising a water-soluble porogen and a surfactant.

In another general embodiment, a product of additive manufacturing with a silicone-based ink includes a three-dimensional printed structure including a plurality of continuous filaments arranged in a predefined pattern and a plurality of inter-filament pores defined by the predefined pattern of the continuous filaments. In addition, each continuous filament includes a silicone matrix having an open cell structure with a plurality of intra-filament pores, and the intra-filament pores form continuous channels through the silicone matrix.

In yet another general embodiment, a method of forming a three-dimensional structure having a porous silicone matrix includes forming the three-dimensional structure using a siloxane mixture comprising a siloxane macromer and a porogen mixture, curing the formed three-dimensional structure to at least a predefined extent to form a silicone matrix, and leaching the porogen mixture from the silicone matrix to result in a plurality of pores forming interconnected channels through the silicone matrix of the three-dimensional structure. The porogen mixture includes glycerol and polyvinyl pyrrolidone.

A list of acronyms used in the description is provided below.
  3D Three-dimensional
  AM Additive manufacturing
  C Celsius
  cps centipoise
  cSt centiStokes
  DIW Direct Ink Writing
  DPS diphenylsiloxane
  ETCH 1-ethynyl-1-cyclohexanol
  FCT face centered tetragonal
  g gram
  G glycerol
  HMDZ hexamethyldisilazane
  Pa Pascals
  Pa-s Pascal seconds
  PDMS polydimethylsiloxane
  PHMS poly(hydrogenmethylsiloxane)
  ppm parts per million
  Pt Platinum
  PVP polyvinyl pyrrolidone
  SEM Scanning electron microscopy
  W Watt
  Wt. % weight percent Inks with a specific rheology used in 3D printing allow the resulting 3D printed structures to retain their shape for an extended period of time before curing.

According to various embodiments, silicone-based inks with appropriate rheological behavior for 3D printing result in printing 3D porous structures with controlled architectures. Various embodiments described herein demonstrate the capability to tune the stiffness of printable silicone materials by controlling the chemistry, network formation, and crosslink density of silicone-based ink formulations in order to overcome the challenging interplay between ink development, post-processing, material properties, and performance. Various embodiments described herein identify materials and methods by which to prepare custom-tailored 3D printable silicone materials through DIW processes.

Moreover, various embodiments described herein demonstrate that through adjustments to the chain lengths of functional silicone-based materials and through the incorporation of reinforcing filler materials, silicones can be prepared with tunable stiffness, unlocking the ability to print functional parts exhibiting anisotropic behavior and properties when printed in tandem or dynamically mixed. Furthermore, custom formulations prepared according to the teaching herein unlock the ability to control the chemistry of silicone-based materials, affecting their aging behavior, material compatibility and biocompatibility, and surface chemistry to impart adhesiveness. Described herein are a series of low temperature stable 3D printable silicones with tunable stiffness developed through a study of silicone rheology, pseudoplasticity, filler loading, and cure inhibition, to facilitate the printing of silicone materials with an extended working lifetime.

Silicone elastomers have broad versatility within a variety of advanced material applications, such as soft robotics, biomedical devices, and metamaterials. However, non-polar silicone materials are not naturally pseudoplastic or thixotropic in which a solid silicone material becomes liquid with applied stress. In would be desirable to develop an ink using non-polar silicone materials so that silicone-based 3D structure may be formed.

In one embodiment, a silicone-based ink for additive manufacturing includes a vinyl-terminated siloxane macromer, a hydrophobic reinforcing filler, and a rheology modifying additive. In some approaches, the vinyl-terminated siloxane macromer may be an oligomeric organosiloxane macromer. In other approaches, the vinyl-terminated siloxane macromer may be a polymeric organosiloxane macromer. In an exemplary approach, the vinyl-terminated siloxane macromer may be a vinyl-terminated polydimethylsiloxane (PDMS) macromer. In some approaches, the vinyl-terminated siloxane macromer may have a viscosity in a range of about 100 centiStoke (cSt) and about 50,000 cSt.

In one embodiment, a silicone-based ink for additive manufacturing includes a vinyl-terminated polydimethylsiloxane-diphenyl siloxane (DPS) macromer, hydrophobic reinforcing filler, and a rheology modifying additive. In some approaches, a vinyl-terminated PDMS-DPS macromer may have a viscosity in a range of about 100 cSt to about 50,000 cSt.

In some embodiments of the silicone-based ink, the hydrophobic reinforcing filler may be treated silica. In some approaches, the treated silica may have a surface area in a range of about 50 $m^2/g$ to about 250 $m^2/g$. In a preferred approach, the treated silica may have a surface area in a range of about 100 m²/g to 200 m²/g for imparting reinforcement while alleviating an increase in viscosity that could obstruct the extrusion process. In some approaches, the treated silica may be hexamethyldisilazane (HMDZ)-treated silica. In other approaches, additional treated silicas with increased hydrophobicity may also be used. In some approaches, a silicone-based ink may include a composite of PDMS-DPS and hydrophobic filler such as HMDZ-treated silica. The hydrophobic reinforcing filler, such as HMDZ-treated silica, may be included to ensure a long-term stability of 3D printed silicone components prior to curing. HMDZ treatment of silica may involve capping the silanol groups of the silica with HMDZ to yield trimethylsilanes and a hydrophobic filler surface.

In some embodiments, fumed silica in the silicone-based ink may be in a range of about 5 wt. % to about 50 wt. % of total composition of the ink, and preferably in a range of about 12 wt. % to about 35 wt. % of total composition of the ink. In some approaches, silica fillers with reduced surface area allow an increase degree of silica loading without over-saturating the liquid ink matrix, and thereby resulting in highly stiff printable silicone materials. In some approaches, the effective concentration of fumed silica may be determined from the surface area of the fumed silica using known techniques.

In other approaches, an untreated silanol-containing filler may likely result in crepe hardening (i.e. thickening of uncured silicones) of the silicone under prolonged storage before curing. Moreover, premature hardening of the silicone may yield a progressive increase in material stiffness due in part to condensation reactions between neighboring silanol groups. Furthermore, the use of untreated silica fillers may reduce the mechanical strength and alter the physical properties of silicones. In some cases, untreated silica fillers may retain more moisture than hydrophobic fillers, and thus may be undesirable for long term applications.

In various embodiments, silicone-based inks may be prepared with a proper rheology for 3D printing in which structures with pre-defined dimensions are formed.

In some embodiments, a rheology modifying additive may be added to impart silicone pseudoplasticity. Rheology modifying additives impart thixotropy in silicone materials. A rheology modifying additive may be a thixotropic additive that imparts pseudoplasticity in silicone elastomers. In some approaches, the rheology modifying additive may be a silicone polyether, a methylvinyl siloxane (or dimethyl siloxane), dimethoxy (glycidoxypropyl)-terminated, glycerol, 2-propanol, or combinations thereof. In some embodiments, the silicone-based ink may include a rheology modifying additive in a range of about 0.01 wt. % to about 10.0 wt % of total composition, and preferably about 0.2 wt. % to about 1.0 wt. % of total composition.

Without wishing to be bound by any theory, it is believed that the mechanism of pseudoplasticity of a silicone-based ink, according to some embodiments, involves the formation of a stable 3D network between treated-silica filler particles and a rheological modifying additive via hydrogen bonding and potential van der Waals interactions.

In other approaches, a more hydrophilic reinforcing filler such as untreated fumed silica may be incorporated into the silicone-based material to impart thixotropy of the silicone material into solid-like network in the absence of applied stress. The mechanism of pseudoplasticity may be attributed to unreacted silanol groups on the silica surface, thereby allowing for particle associations through hydrogen bonding to form an anti-sagging network exhibiting shape retention behavior.

Embodiments described herein encompass a low-temperature stable silicone-based material with the ideal rheology for 3D printing, which may be custom formulated to yield a wide range of physical properties applicable to a variety of fields and industries. For example, the reinforcing filler may be refractive index-matched to impart a 3D silicone structure with transparent optical-grade properties. According to various embodiments described herein, a wide-range of silicone-based 3D structures of varying hardness and stiffness levels may be prepared from silicone-based materials.

In some embodiments, silicone-based inks may be pseudoplastic, non-Newtonian fluids, capable of being deposited in a layer-by-layer pattern during 3D printing.

In some embodiments, the silicone-based ink may include a curing agent. In some approaches, the curing agent may utilize hydrosilylation chemistry during the curing of the 3D structure, such as a platinum curing agent (e.g., Karstedt Pt catalyst), ruthenium curing agent, iridium curing agent, and/or rhodium curing agent. In some approaches, platinum-catalyzed hydrosilylation chemistry (e.g. platinum catalyzed addition of silanes to alkenes) may be used to cure the structured formed with silicone-based inks. In other approaches, ruthenium-catalyzed hydrosilylation chemistry may be used to cure the structures formed with silicone-based inks. In yet other approaches, iridium-catalyzed hydrosilylation chemistry may be used to cure the structures formed with silicone-based inks. In yet other approaches, rhodium-catalyzed hydrosilylation chemistry may be used to cure the structures formed with silicone-based inks.

In some approaches, it is advantageous to use platinum (Pt)-group metal-catalyzed hydrosilylation chemistry because the process does not generate volatile reaction products as compared to condensation cure reactions that produce byproducts such as acetic acid and ethanol. Moreover, these byproducts could deleteriously contribute to some material shrinkage and deviation from the form of the printed 3D structure as deposited.

In some embodiments, the silicone-based ink may include a Pt-group metal curing agent involved in metal catalyzed hydrosilylation chemistry, at a concentration in the range of about 1 to about 1000 ppm, and preferably in a range of about 1 to about 100 ppm, and ideally, 1 to about 50 ppm. In some approaches, the silicone-based ink may include an effective amount of Pt-group metal to initiate a metal-catalyzed hydrosilylation chemistry curing reaction at pre-defined curing conditions, e.g. a pre-defined elevated temperature.

In some embodiments, the silicone-based ink may include an effective amount of an inhibitor for controlling a rate of curing by the curing agent under ambient atmospheric conditions. In some approaches, the inhibitor may be selected based on the curing agent. In some approaches, to maximize the printing time before cure (for example, delay the curing reaction as long as possible), an appropriate choice of a reaction inhibitor relative to the curing agent may be added to inhibit platinum-catalyzed curing chemistry, thereby providing a prolonged pot life duration for extended 3D printing sessions.

In some approaches, in the absence of the reaction inhibitor, the curing mechanism involving the polymerization reaction may proceed rapidly thereby solidifying the printed part within minutes. Thus, a metal-catalyst curing agent (for example Karstedt Pt catalyst), without reaction inhibitor may be undesirable for silicone-based inks involved in the printing of large parts.

In some approaches, the curing agent may induce curing in response to ultraviolet radiation. In other approaches, a curing agent may induce curing in response to free radical chemistry. In yet other approaches, the curing agent may induce curing in response to ionizing radiation. Known curing agents may be used in such approaches.

In some embodiments, the silicone-based ink may include a cross-linking agent as used in cure chemistry. For example, one hydrosilylation cure of siloxanes involves a poly(methylhydrosiloxane) containing additive in which the number of methylhydrosiloxane units along the polymeric or oligomeric chain may be greater than 3 per molecule. In various embodiments, through the implementation of dihydride chain extension chemistry, a silicone-based ink may be formed with very low hardness and stiffness that may be applicable to soft robotics and flexible electronics. In some approaches, a cross linking agent may be hydride terminated chain extension additives, for example, a hydride terminated PDMS-poly(hydrogenmethylsiloxane)(PHMS) copolymer. In other approaches, a short chain vinyl terminated PDMS additive may also be included to impart greater hardness to the cured material.

In some embodiments, the silicone-based inks may contain a surfactant in order to tailor the multiphase morphology of the ink, resulting in a modification to the porous structure of the final material. Surfactants molecules may have hydrophilic (e.g. polyether, carboxylic acid, groups) and hydrophobic regions (e.g. siloxanes, fluorinated polyethers, fluorinated alkanes, etc.). Rheology modifiers as described in the earlier section may also have surfactant properties when used in the inks.

In some embodiments, the silicone-based inks described herein may be stable at low temperatures. Conventional PDMS-based materials exhibit relatively poor temperature stability beyond −45° C. due to PDMS crystallization. In some approaches, the replacement of PDMS with a random copolymer of PDMS and about 2-6 mole % diphenylsiloxane (DPS) may impart low temperature stability of silicone-based ink. For example, incorporation of the diphenyl moieties of DPS may inhibit crystallization of the PDMS chains at reduced temperature. In other approaches, short chain vinyl-terminated PDMS may be used with additional silica filler to decrease the average molecular weight between crosslinking sites thereby resulting in high hardness and stiffness of the 3D printed structure from the silicone-based ink.

In some embodiments, the silicone-based inks may be formulated to yield two-part materials in predetermined ratios. For example, Part A may include vinyl-terminated poly(dimethylsiloxane)-co-(diphenylsiloxane) macromer, a hydrophobic reinforcing filler, a rheology modifying additive, and a curing agent; and Part B may include a curing agent inhibitor, a crosslinker and an additional vinyl-terminated polydimethylsiloxane-co-diphenysiloxane macromer to create a 10:1 2-part A:B system. In some approaches, Part A may be assembled and then may be stored until use. Part B may be assembled and then stored until use. In other approaches, Part A and Part B may be assembled separately and used immediately.

Figure 1:
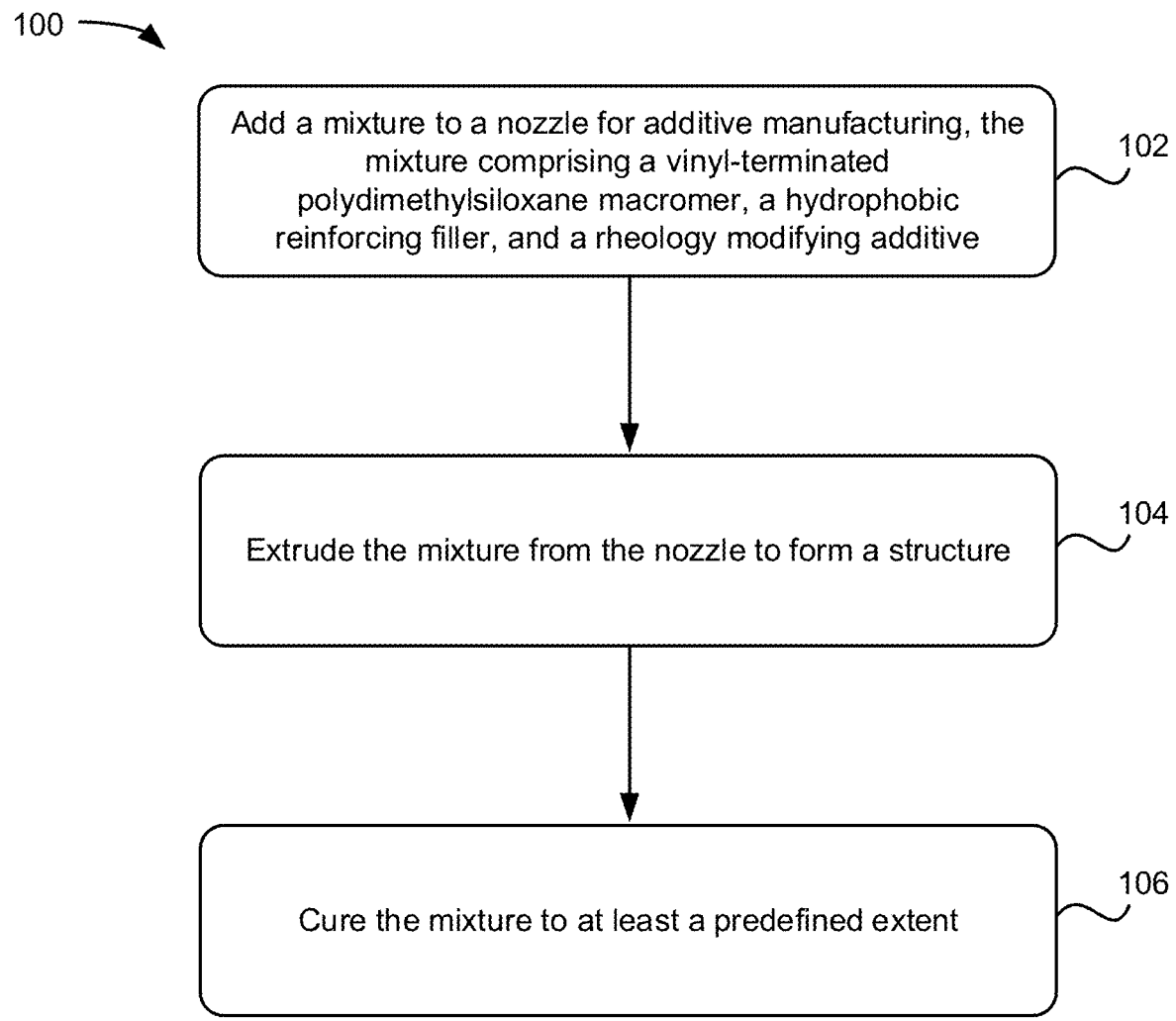
FIG. 1 is a flow chart of a method, according to one embodiment.

FIG. 1 shows a method 100 for additive manufacturing with silicone-based ink, in accordance with one embodiment. As an option, the present method 100 may be implemented to construct structures such as those shown in the other FIGS. described herein. Of course, however, this method 100 and others presented herein may be used to form structures for a wide variety of devices and/or purposes which may or may not be related to the illustrative embodiments listed herein. Further, the methods presented herein may be carried out in any desired environment. Moreover, greater or fewer operations than those shown in FIG. 1 may be included in method 100, according to various embodiments. It should also be noted that any of the aforementioned features may be used in any of the embodiments described in accordance with the various methods.

According to one embodiment, the method 100 begins with step 102 involving adding a mixture to a cartridge for additive manufacturing, the mixture comprising a vinyl-terminated polydimethylsiloxane macromer, a hydrophobic reinforcing filler, and a rheology modifying additive. In this and other embodiments, the cartridge may be a nozzle. The mixture may be formed in the nozzle, where one or more of the components is added to the nozzle separately from the other components. A mixer may provide mixing within the nozzle. In another approach, the mixture may be premade and fed to the nozzle.

In some approaches, step 102 may include adding to the mixture, in the cartridge, a curing agent and/or a crosslinking agent. Alternatively, the curing agent and/or crosslinking agent may be part of a premade mixture that is fed through the cartridge.

In yet other approaches, step 102 may include adding to the mixture, in the cartridge, an effective amount of an inhibitor for controlling a rate of curing by the curing agent. Alternatively, the inhibitor may be part of a premade mixture that is fed through the cartridge.

Step 104 of method 100 involves extruding the mixture through the cartridge to form a structure. In various approaches, the presence of a rheology modifying additive imparts pseudoplasticity to the silicone-based ink such that the compression stress of the ink in the cartridge allows the ink to be extruded from the cartridge during 3D printing.

Step 106 of method 100 involves curing the mixture to at least a predefined extent. In various approaches, the 3D printed structure of silicone-based ink may be cured according to the curing agent present in the silicone-based ink. In some approaches, the temperature may be raised in order to initiate curing. In other approaches, UV irradiation may be used to initiate curing of the printed structure. In yet other approaches, free radical chemistry may be used to initiate curing of the printed structure. In various other approaches, curing may be initiated by methods known by one skilled in the art.

In some approaches of method 100, the formed structure may be a three-dimensional structure. In some approaches of method 100, the applied manufacturing is direct ink writing.

In one embodiment, a product of additive manufacturing with a silicone-based ink includes a vinyl-terminated siloxane macromer, a hydrophobic reinforcing filler, a rheology modifying additive, a curing agent, an inhibitor of the curing agent, and a crosslinking agent. In some approaches, the product may be a silicone-based three-dimensional (3D) structure.

In some embodiments, the product of additive manufacturing with silicone-based ink may have features about 100 µm or larger. Based on the ink viscosity smaller features may be created below 100 µm. In some embodiments, the product may have dimensional stability. In other words, the structure formed following 3D printing with silicone-based inks may retain pre-defined dimensions following curing of the structure, for example, there is minimal shrinkage.

In some embodiments, 3D printable silicone-based materials may be prepared with hardness values as low as Shore 10A (see Table 1 Experiments Section below), indicating penetration by the indenter of the durometer. A Shore durometer may be used to provide a measure of hardness in polymer, elastomer, and rubber material in terms of the material's resistance to indentation. The inclusion of dihydride chain extenders may serve to increase the molecular weight of the silicone polymer between crosslinking sites, yielding a material with reduced hardness and stiffness.

Figure 2:
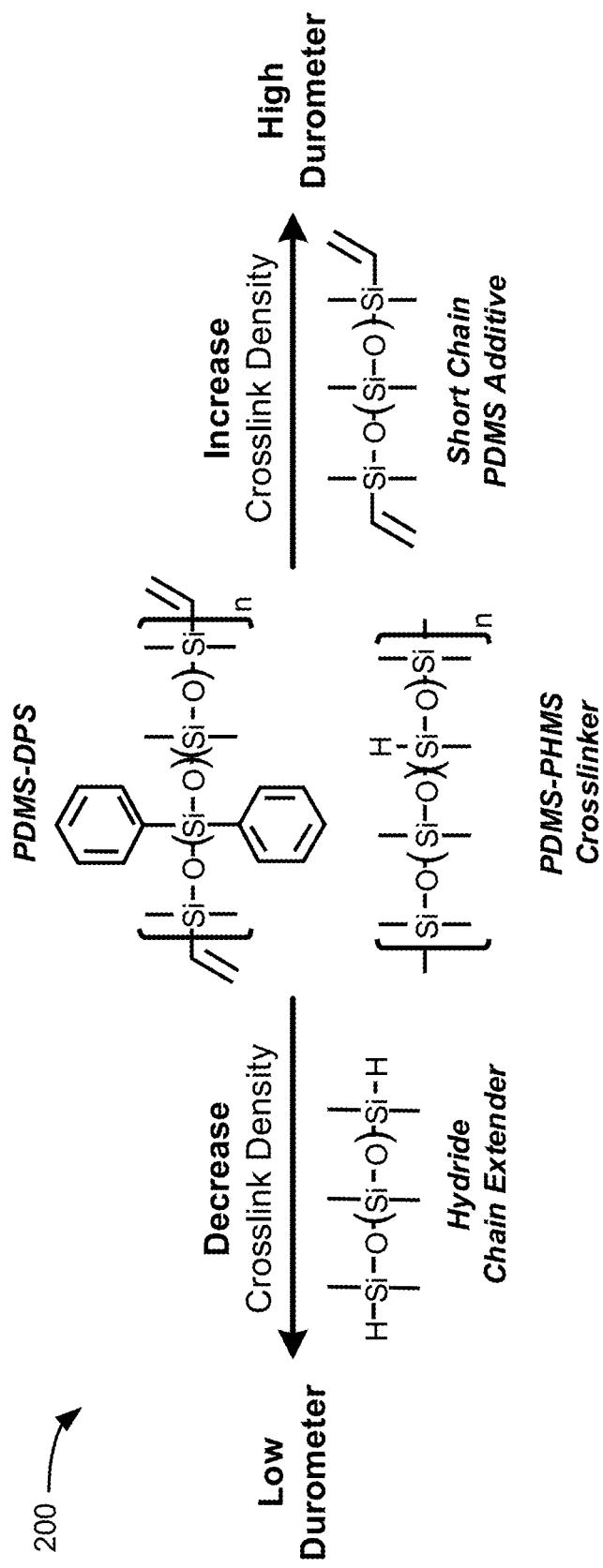
FIG. 2 is a schematic drawing of durometer silicone elastomers, according to various embodiments.

FIG. 2 depicts a structure 200 of variable durometer silicone elastomers, in accordance with one embodiment. As an option, the present structure 200 may be implemented in conjunction with features from any other embodiment listed herein, such as those described with reference to the other FIGS. Of course, however, such structure 200 and others presented herein may be used in various applications and/or in permutations which may or may not be specifically described in the illustrative embodiments listed herein. Further, the structure 200 presented herein may be used in any desired environment.

FIG. 2 is a simplified diagram that describes the formulation of variable durometer silicone elastomers. The core formulation components involved in custom stiffness tuning include a vinyl terminated PDMS-DPS polymer in conjunction with a hydride terminated PDMS-PHMS copolymer crosslinker, other components include silica fillers, rheological additives, inhibitors, and curing agents (for example, Pt catalysts). In some approaches, a reduction in the effective crosslink density and less stiffness (shifting to the left, Low Durometer) may be achieved through the use of hydride terminated chain extension additives. In other approaches, an increase in the effective crosslink density and greater stiffness (shifting to the right, High Durometer) may be achieved through the use of low molecular weight or short chain vinyl terminated PDMS additives, or those additives such as vinyl containing siloxane resins, such as siloxane resins built from M and Q units (MQ resins).

In one embodiment, the stiffness and rheological properties of a siloxane formulation may be tuned to complement the addition of a soluble particle as a pore-former additive. In some approaches, a 3D part is printed with a siloxane ink having soluble particles where the particle in the printed 3D part may be removed post processing of the printed 3D part thereby imparting an intra-filament (e.g., intra-strand, intra ligament, etc.) porosity in the part. Intra-filament pores are defined as pores inside the associated filament. Each filament of a structure has intra-filament space comprised of material and pores, e.g., intra-filament pores. Inter-filament pores are defined as pores between two adjacent filaments. A structure is comprised of a plurality of filaments and the space between adjacent filaments is the inter-filament space, e.g., inter-filament pores.

In one embodiment, a silicone-based ink for additive manufacturing includes a vinyl-terminated diphenyl siloxane macromer, a treated silica hydrophobic reinforcing filler, a rheology modifying additive, and a plurality of porogen particles. In various approaches, the porogen particles are soluble in an aqueous solution. In a preferred approach, the porogen particles are soluble in water at a temperature in a range of about 40° C. to about 90° C., and preferably at about 80° C.

In preferred approaches, the porogen particles have an average diameter in a range of 1 microns (μm) to about 50 μm. An average diameter of a porogen particle is defined as the average of the maximum dimension of each particle. An average diameter of a plurality of porogen particles is defined as the average of a plurality of average diameters of porogen particles. In one approach, the average diameter of the porogen particles is in a range of about 10 μm to 30 μm.

In various approaches, the porogen particles may be a particle that may be removed from the printed structure following formation of the printed structure. In one approach, the porogen particles may be removed by soaking the printed part in a solution that dissolves the porogen particles. In one approach, the porogen particles may be removed by a heat treatment of the printed part that removes the porogen particles from the printed part while leaving the printed part intact.

In various approaches, the porogen particles are materials that may be incorporated on the siloxane ink to serve as a porogen. Any material that does not inhibit the crosslinking process of the siloxane formulation and can be removed or leached out of the siloxane structure has the potential to be usable as a porogen. In one approach, urea particles may be included in the siloxane ink as porogen particles. In one approach, sugar particles may be included in the siloxane ink as porogen particles. In another approach, polyethylene glycol particles, a mixture of urea particles with glycerol, etc. may be included in the siloxane ink as porogen particles.

In one embodiment, a product may include an ink as described and instructions for using the ink with an extrusion nozzle. In one approach, the instructions may be available online from a remote location. In one approach, the instructions may be in a container with the ink. In one approach, the instructions may be obtained on a container holding the ink. In preferred approaches, the average diameter of the porogen particles is relative to the diameter of the extrusion nozzle. In preferred approaches, the mean size distribution of the porogen particles in terms of average diameter of the porogen particles may have a ratio to the diameter of the extrusion nozzle to be about 1:10. In some approaches, inks including porogen particles where the ratio of the average diameter of the largest of the porogen particles to the diameter of the extrusion nozzle may be as high as 1:3. However, in exemplary approaches, the majority of the porogen particles (e.g., at least 50% of the porogen particles) have an average diameter below a ratio of 1:10 of the diameter of the extrusion nozzle.

In some approaches, the ratio of average diameter of urea particles to a diameter of the extrusion nozzle is a preferred assessment for determining an average diameter of urea particles for an ink formulation. In one approach, a range of ratios of an average diameter of the porogen particles to a diameter of the extrusion nozzle may be about 1:5 to about 1:100. In an exemplary approach, the ratio of the diameter of the porogen particles to the diameter of the extrusion nozzle is about 1:10.

For example, and not meant to be limiting in any way, in one preferred approach a siloxane ink extruded from a 250 μm nozzle for printing a 3D part may include porogen particles having an average diameter of about 20 to 25 μm.

In some approaches, a spherical porogen particle may be desirable for a final application of the ink and product. In one approach using solid porogen material, highly spherical porogen particles may lower the stiffness of the resin at high porogen loading. In some approaches, an average circularity of the porogen particles may be greater than 0.90. In preferred approaches, an average circularity of the porogen particles may be greater than 0.95.

In another approach, using a mixture of solid porogen particles with a liquid coating material, for example, a mixture of urea particles with glycerol, the porogen particles with lower sphericity (e.g., non-spherical particles) might generate a highly porogen loaded printable ink.

By varying the amount of porogen on the siloxane formulation, additively manufactured structures using the direct ink write technique (DIW) with open or closed cell arrangements may be achieved. In some approaches, a concentration of porogen particles may be in a range of greater than 0 volume % (vol %) to about 75 vol % of volume of total ink but may be higher. In one approach, a lower vol % (e.g., greater than 0 vol % to about 30 vol %) may generate a closed cell arrangement of pores in the printed 3D structure. In one approach, a higher volume % (e.g., greater than 50 vol % to about 75 vol % but could be higher) may generate an open cell arrangement of pores in the 3D printed part. In an exemplary approach, a concentration of porogen particles in the ink may be about 50 vol % of the volume of total ink.

In an exemplary approach, the porogen particle is a urea particle. In one approach, a plurality of urea particles may be formed for the ink by using a capillary rheometer such that urea droplets are melt extruded to form spherical particles. In one approach, an average diameter of the urea particles may be in a range of about 10 µm to about 50 µm. In an exemplary approach, an average diameter of the urea particles is about 11 µm. In some approaches, a preferred diameter of an extruded filament may be in a range of 100 µm to 1000 µm, thus, a preferred average diameter of urea particles may be in a range of 10 µm to 100 µm.

In one embodiment, a printed 3D structure having intra-filament porosity may be formed by leaching the soluble particles following printing and processing of the 3D structure formed with siloxane ink having soluble particles therein. In one approach, a process of applying heated water to the printed 3D structure of siloxane ink having urea particles may remove substantially all urea particles from the printed strands of the 3D structure. In other words, following application of heated water, the 3D printed siloxane structure includes substantially no urea particles, and a pore, void, etc. is in the location of the previously situated urea particle.

FIGS. 9A-9B depict a structure 900 of a 3D printed siloxane structure, in accordance with one embodiment. As an option, the present structure 900 may be implemented in conjunction with features from any other embodiment listed herein, such as those described with reference to the other FIGS. Of course, however, such structure 200 and others presented herein may be used in various applications and/or in permutations which may or may not be specifically described in the illustrative embodiments listed herein. Further, the structure 900 presented herein may be used in any desired environment.

FIGS. 9A and 9B scanning electron microscopy (SEM) images of a 3D printed siloxane structure, according to one embodiment, and are by way of example only and not meant to be limiting in any way.

In one embodiment, the structure 900 is a product of additive manufacturing with a silicone-based ink. The structure 900 includes a plurality of continuous filaments 906a, 906b. The continuous filaments 906a, 906b are comprised of a siloxane matrix 908. In one approach, the siloxane matrix may include vinyl terminated siloxane polymers.

In some approaches, the continuous filaments may be arranged in a geometric pattern. As shown in the structure 900, the continuous filaments 906a, 906b are arranged in a log-pile formation where a first layer of continuous filaments 906a are parallel to each other, and the second layer of continuous filaments 906b is positioned directly above the first layer, where the continuous filaments 906b of the second layer positioned largely perpendicular to the continuous filaments 906a of the first layer. In top down view of the structure 900 in FIG. 9B, the structure 900 has a geometric pattern 910 of the continuous filaments 906a, 906b.

In some approaches, the geometric pattern may be determined by the additive manufacturing technique.

In one approach, the 3D printed siloxane structure may have a plurality of inter-filament pores, where the inter-filament pores may be defined by the geometric pattern of the continuous filaments. As shown for structure 900, the geometric pattern 910 of the continuous filaments 906a, 906b forms a plurality of inter-filament pores 902. The inter-filament pores 902 may be defined by the geometric pattern 910. In some approaches, the inter-filament pores 902 may be tuned for a desired application.

In some approaches, as shown in part (a) of FIG. 9A, the diameter $d_{erx}$ of the inter-filament pores 902 may be greater than 100 µm. In one approach, the diameter $d_{er}$ of the inter-filament pores 902 may be similar to the diameter $d_{f1}$, $d_{f2}$ of the continuous filaments 906a, 906b. The diameter $d_{f1}$, $d_{f2}$ of the continuous filament 906a, 906b may be measured across the width of the filaments 906a, 906b extruded from the nozzle. In one approach, the diameter $d_{er}$ of the inter-filament pores 902 may be less than the diameter $d_{f1}$, $d_{f2}$ of the continuous filaments 906a, 906b. In one approach, the diameter $d_{er}$ of the inter-filament pores 902 may be greater than the diameter $d_{f1}$, $d_{f2}$ of the continuous filaments 906a, 906b.

In one approach, the continuous filaments of the 3D structure may have an average diameter greater than about 100 µm. As shown in part (a) of FIG. 9A, for example in one approach, the average diameter $d_{f2}$ of the continuous filament 906b may be about 150 µm, and the average diameter $d_{f1}$ of the continuous filament 906a may be about 150 µm. As shown at a slightly lower magnification in FIG. 9B, the average diameter $d_{f2}$ of the continuous filament 906b may be about 150 µm, and the average diameter $d_{f1}$ of the continuous filament 906a may be about 150 µm.

In some approaches, the 3D printed siloxane structure may have a plurality of intra-filament pores. Part (b) of FIG. 9A is an expanded drawing of the cross-wise section of the continuous filament 906b as shown in part (a). As shown in part (b), the continuous filament 906b has a plurality of intra-filament pores 904 of various sizes. The intra-filament pores 904 are inside the continuous filaments 906a, 906b.

In some approaches, the intra-filament pores 904 may have an average diameter $d_{ra}$ in a range of greater than 1 µm to less than 200 µm. An average diameter $d_{ra}$ refers to an average of all diameters of the intra-filament pores where each diameter is measured as the greatest distance between two opposite ends of a pore, as shown for example in part (b).

In various approaches, the size and shape of the porogen particles may generate inter-connectivity between the pores of the 3D printed part. In one approach, spherical porogen particles may generate closed pores within the 3D printed part. In one approach, elongated porogen particles may generate an open inter-connected network of pores within the 3D printed part.

In various approaches, all continuous filaments formed by the siloxane ink during additive manufacturing techniques to form the 3D printed siloxane structure include a plurality of intra-filament pores.

In some approaches, the structure 900 has having inter-filament pores 902 interconnected from a surface of the 3D silicone-based structure to a surface on an opposite side of the 3D silicone-based structure.

In one approach, the intra-filament pores 904 may be interconnected from a surface of the associated filament 906a (as shown in part (a) of FIG. 9A) to a surface on an opposite side of the associated filament 906a. In other approaches, the intra-filament pores may not be interconnected. In various approaches, the interconnectedness of the intra-filament pores may depend on the concentration of porogen particles in the siloxane ink.

In some embodiments, the direct application of additive manufacturing using silicone-based inks with tunable stiffness may allow engineering of components and parts with specific properties including both low and high potential stiffness. In some approaches, silicone-based materials with differential stiffness may be 3D printed in tandem or simultaneously to generate unique objects with novel properties that are applicable to a wide-range of fields such as soft robotics and stretchable electronics.

FIG. 10 shows a method 1000 for forming a 3D printed siloxane structure having intra-filament porosity, in accordance with one embodiment. As an option, the present method 1000 may be implemented to construct structures such as those shown in the other FIGS. described herein. Of course, however, this method 1000 and others presented herein may be used to form structures for a wide variety of devices and/or purposes which may or may not be related to the illustrative embodiments listed herein. Further, the methods presented herein may be carried out in any desired environment. Moreover, greater or fewer operations than those shown in FIG. 10 may be included in method 1000, according to various embodiments. It should also be noted that any of the aforementioned features may be used in any of the embodiments described in accordance with the various methods.

The method 1000 begins with step 1002 of extruding a continuous filament of a silicone-based mixture through a nozzle to form a three-dimensional printed silicone-based structure. The silicone-based mixture, according to one approach, includes a vinyl-terminated siloxane macromer, a treated silica hydrophobic reinforcing filler, a rheology modifying additive, and a plurality of porogen particles.

In one approach, a range of a ratio of an average diameter of the porogen particles to a diameter of the nozzle is about 1:5 to about 1:100. Preferably, the ratio of average diameter of the porogen particles to a diameter of the nozzle is about 1:10. In some approaches, the average diameter of the porogen particles may be analyzed by volume distribution. In various approaches, the average diameter of porogen particles refers to an average of diameters measured from a plurality of porogen particles where each diameter is the largest distance between two opposite ends of a porogen particle. In some approaches, the diameter of the nozzle may be less than 1000 µm, so as an example and not meant to be limiting in any way, a preferred average diameter of the porogen particles may be about 50 µm or less. In some approaches, the diameter of the nozzle may be about 250 µm, thus, a preferred average diameter of the porogen particles may be about 25 µm or less.

In some approaches, the silicone-based mixture is an ink. In one approach, the ink includes porogen particles where the ratio of the average diameter of the largest of the porogen particles to the diameter of the extrusion nozzle may be as high as 1:3. However, in exemplary approaches, the majority of the porogen particles (e.g., at least 50% of the porogen particles) have an average diameter below a ratio of 1:10 of the diameter of the extrusion nozzle.

In addition to having control over the pore connectivity on the printed filaments, by tailoring the size and shape of the porogen particle, the pore network morphology may be tuned. In one approach, the porogen particles may be spherical in shape. In another approach, the porogen particles may be elongated in shape, thereby generating elongated pores within the 3D printed structure that may be interconnected.

In some approaches, the ink may be tuned for a low concentration of porogen particles. In other approaches, the ink may be tuned for a high concentration of porogen particles. In some approaches, a concentration of porogen particles in the ink may depend on the application of the ink in a direct ink writing process. In some approaches, a concentration of the ink may be in a range of greater than 0 vol % to about 75 vol % of volume of total ink but may be higher. In one approach, a lower volume % (e.g., greater than 0 vol % to about 30 vol %) may generate a closed cell arrangement of pores in the printed 3D structure. In one approach, a higher vol % (e.g., greater than 50 vol % to about 75 vol % but could be higher) may generate an open cell arrangement of pores in the 3D printed part. In an exemplary approach, the concentration of porogen particles in the ink may be about 50 vol % of volume of total ink but may be higher or lower.

In various approaches, the porogen particles are materials that may be incorporated on the silicone-based ink to serve as a porogen. Any material that does not inhibit the cross-linking process of the siloxane formulation and can be removed or leached out of the siloxane structure has the potential to be usable as a porogen. In one approach, urea particles may be included in the siloxane ink as porogen particles. In one approach, sugar particles may be included in the siloxane ink as porogen particles. In another approach, polyethylene glycol particles, a mixture of urea particles with glycerol, etc. may be included in the siloxane ink as porogen particles.

In one approach, the mixture may include a curing agent and a crosslinking agent. In one approach, the mixture may include an effective amount of an inhibitor for controlling a rate of curing by the curing agent.

Step 1004 of method 1000 includes curing the extruded continuous filament of the silicone-based mixture to at least a predefined extent. In some approaches, step 1004 includes curing the silicone-based mixture to at least a predefined extent to solidify the three-dimensional printed silicone-based structure.

Step 1006 of method 1000 includes leaching the porogen particles from the cured continuous filament of the three-dimensional printed silicone-based structure. In some approaches, leaching the porogen particles includes soaking the three-dimensional printed siloxane structure in a solution to dissolve the porogen particles. For example, and not meant to be limiting in any way, in an exemplary approach, the porogen particles may be urea particles where the urea particles may be removed from the 3D printed siloxane structure by leaching the structure in water at an elevated temperature above room temperature, e.g., 80° C., for a duration of time, e.g., between 15 minutes to 30 minutes.

According to one embodiment, a methodology for combining porosity generated from direct ink writing (DIA) and intra-strand porosity may enable multiple size features within the same material to produce 3D printed polysiloxane foams. In one approach, the foam may use a water-soluble mixture of polyvinyl pyrrolidone (PVP) and glycerol (G) to serve as a leachable porogen in a silicone rubber matrix. The addition of PVP-G into a silicone results in a ternary mixture that enables tunability in the design of the porous structure.

Depending on the composition, a porogen-in-silicone emulsion, a silicone-in-porogen emulsion, and a co-continuous pore structure may be formed. In addition, to the tunability of the porous structure, the mixture may also allow for degrees of freedom with respect to the rheology of the resulting ink, thereby enabling the thixotropy needed for successful extrusion-based printing (e.g., DIW).

In one approach, conventional stochastic foam structure may be incorporated into DIW processes, such that macro-scale porosity (e.g., extruded filaments forming inter-strand porosity) and micro-scale porosity (e.g., intra-strand porosity) may enable multiple feature sizes within the same material. In some approaches, the result may combine the advantages of both methods: improved mechanical performance and enhanced light-weighting.

Accordingly, one embodiment described herein combines the use of a leachable additive into an extrusion-based compatible ink to allow for the formation of a structure having a combination of macro- and micro-scale porosity.

In one approach, a method is described for producing porous silicones with tunable porosity and characteristic pore size. Additionally, extrusion-based printing processes (e.g., DIW) may be used to additively manufacture porous silicone compositions. In one approach, the method includes a combination of a silicone resin to act as the material matrix, glycerol to perform as a leachable porogen, and PVP to perform as a surfactant to aid in the control of the micro-porosity morphology.

In some approaches, the silicone resin described herein may be incorporated with other pore-forming methods to add more control of the pore morphology. In one approach, urea particles may be included with the silicone resin having a leachable porogen and surfactant therein.

For approaches involving extrusion-based additive manufacturing processes (e.g., DIW), the silicone resin, mixture, etc. preferably is extrudable from nozzle sizes ranging from about 100 µm to about 1 mm but could be smaller or larger.

In one approach, the volume loading of the glycerol and PVP may result in porosities ranging from about 40% to 70% of the silicone matrix material of the filaments of the formed structure. Moreover, after removal of the porogen from the formed structure, the overall shrinkage of the material of the structure may be less than 5% of the size of the original formed structure including the porogen.

In one embodiment, a silicone-based ink for additive manufacturing includes a silicone macromer and a porogen mixture that includes a water-soluble porogen and a surfactant. In a preferred approach, silicone macromer includes a vinyl-terminated siloxane macromer as described herein.

In one approach, the water-soluble porogen may be a viscous liquid porogen miscible in water. In a preferred approach, the water soluble porogen has a viscosity in a range of about 1-2 Pascal-seconds (Pa-s) to about 500 Pa-s (or in a range of about 1000 to 2000 centipoise (cps)). In a preferred approach, the aqueous porogen includes glycerol, having a viscosity of about 1.4 Pa-s/1400 cps. In a preferred approach, the surfactant includes polyvinyl pyrrolidone. In one approach, a composition of silicone-based ink includes silicone, glycerol, and PVP.

In one approach, the silicone-based ink having a porogen mixture includes a curing agent. As described herein, the curing agent may utilize hydrosilylation chemistry for curing the ink-extruded structure.

In a preferred approach the silicone-based ink having a porogen mixture includes an additive as a filler. For example, in one approach, the silicone-based ink includes untreated silica, e.g., hydrophilic silica, as a thickener of the ink composition. In one approach, the silicone-based ink includes fumed silica. In some approaches, a concentration of the untreated silica (e.g., fumed silica) in the silicone-based ink may be in a range of about 5 wt. % to about 50 wt. % of total composition of the ink. In preferred approaches, the concentration of untreated silica may be in a range of 10 wt. % to about 30 wt. %. In some approaches, an effective amount of untreated silica (e.g., fumed silica) for thickening the ink may be determined from the surface area of the untreated silica using known techniques. In other approaches, the ink may include a hydrophobic silica, e.g., a treated silica, as described herein.

In one approach, the silicone-based ink having a porogen mixture includes a rheology modifying additive, as described herein. In some approaches, an effective amount of rheology modifying additive may be added to impart silicone pseudoplasticity in the extruded ink. In some approaches, a thixotropic agent may be included in the composition of the ink.

In one approach, the silicone-based ink having a porogen mixture includes additional porogen components. In one approach, the porogen mixture may include porogen particles as described herein. For example, the porogen mixture may include at least one of the following: urea particles, sugar particles, polyethylene glycol, or a combination thereof. In one approach, the porogen mixture may include sodium chloride.

FIG. 19 depicts a schematic diagram of a process 1900 of forming a structure 1902 of a 3D printed silicone structure, in accordance with one embodiment. As an option, the present structure 1900 may be implemented in conjunction with features from any other embodiment listed herein, such as those described with reference to the other FIGS. Of course, however, such structure 1902 and others presented herein may be used in various applications and/or in permutations which may or may not be specifically described in the illustrative embodiments listed herein. Further, the structure 1902 presented herein may be used in any desired environment.

According to one embodiment, a process 1900 may begin with an ink composition 1910 as shown in part (a). The ink composition 1910 may include a porogen mixture 1904 that includes a combination of glycerol and PVP, a surfactant. The ink composition 1910 also includes a silicone 1906. The porogen mixture 1904 and silicone 1906 of the ink composition 1910 may be stirred with a stirring rod 1908 to fully combine the two components, porogen mixture 1904 and silicone 1906.

As shown in part (b) of FIG. 19, depending on the respective concentrations of the porogen mixture 1904 and silicone 1906 in the ink composition 1910, different morphologies may form after curing the ink composition 1910. The curing reaction causes the silicone of the ink to cure and form the matrix, and the curing reaction likely does not affect the porogen mixture of the ink.

In the upper configuration of part (b), the pore morphology may be a porogen-in-silicone emulsion 1912, where an ink composition having a significantly greater concentration of silicone 1906 to porogen mixture 1904 forms a silicone matrix 1914 having small portions of porogen mixture 1904 intermixed throughout the silicone matrix 1914.

In the middle configuration of part (b), the pore morphology may be a silicone-in-porogen emulsion 1916, where the ink composition 1910 includes a significantly greater concentration of porogen mixture 1904 to silicone 1906. After curing the pore morphology is a silicone-in-porogen emulsion 1916 where regions of silicone matrix 1914 are intermixed in the porogen mixture 1904.

In the bottom configuration of part (b), the pore morphology may be characteristic of a co-continuous pore structure 1918, where a pore structure forms from co-continuous phases of porogen mixture 1904 and the silicone matrix 1914. In some approaches, the co-continuous pore structure 1918 is the preferred pore morphology.

Next, the porogen mixture 1904 may be removed by washing out, rinsing, flushing, etc. the structure 1918 of the co-continuous pore morphology with warm water. As shown in part (c), the remaining porous silicone structure 1902 includes the silicone matrix 1914 with pores 1920 containing air, voids, etc.

In one embodiment, a product of additive manufacturing with a silicone-based ink may include a 3D printed structure. For example, in one approach, the product may include the porous silicone structure 1902 as illustrated in part (c) of FIG. 19. The 3D printed structure may include a plurality of continuous filaments arranged in a predefined pattern. Although not shown in the porous silicone structure 1902, a predefined pattern may be formed from extrusion-based AM methods wherein continuous filaments are extruded with the silicone-based ink to form a predefined pattern. In one approach, the continuous filaments each include a silicone matrix having open cell structure with a plurality of intra-filament pores. The intra-filament pores may form continuous channels through the silicone matrix. In addition, the 3D printed structure includes a plurality of inter-filament pores, where the inter-filament pores may be defined by the predefined pattern of the continuous filaments.

In one approach, a silicone matrix may have a closed cell structure. In one approach, a silicone matrix having a closed cell structure may not be porous, where the closed cells may include a porogen material. In another approach, the porogen material within the closed cells may be removed, thereby creating a porous silicone matrix having a closed cell structure. Removing a porogen from closed cells of a silicone matrix may include diffusion of the porogen through the matrix without disruption of the closed cells.

In some approaches, the continuous filaments arranged in a predefined pattern each have an average diameter greater than about 100 µm thereacross. In one approach of extruded continuous filaments, the average diameter may be determined from a cross section of the extruded filament.

In various approaches, a foam porosity may be tuned on several scales, e.g., macroscale, microscale, etc. In one aspect, the additive manufacturing of the foam allows a predefined macro-scale porosity. For example, an average diameter of the inter-filament pores may be in a range of about 100 µm to about 1000 µm but may be smaller or larger. In another aspect, the leachable porogen phase of the silicone matrix allows a micro-scale porosity. For example, an average diameter of the intra-filament pores may be in a range of about 1 µm to about 100 µm but may be smaller or larger.

In some approaches, the inter-filament pores may be interconnected from a surface of the 3D printed structure to a surface on the opposite side of the 3D printed structure. In one approach, the inter-filament pores form continuous channels from one side of the 3D structure to the opposite side of the 3D structure.

In some approaches, the morphology of the micro-scale porosity may be tuned by the use of a surfactant. For example, in one approach, the morphology of the micro-scale porosity may be tuned by the use of PVP surfactant.

In one approach, the silicone matrix of the 3D printed structure includes vinyl terminated siloxane polymers, as described herein.

FIG. 20 is a ternary diagram of each component of an ink composition, according to one embodiment. The ternary diagram depicts a barycentric plot of the three variables (e.g., phases), silicone, PVP, and glycerol, which sum to a constant ink composition. In some approaches, the silicone phase includes a siloxane macromer. As shown, the diagram may be divided into four regions I, II, III, and IV. Preferred regions of each component combined to sum the ink composition includes regions I, II, and III whereas region IV exhibited poor washout of the PVP/glycerol porogen mixture. The image inset in the diagram illustrates a material exhibiting poor washout.

Looking to the ink compositions of region I, the concentration of silicone is in a range of 50 wt % to 85 wt %, the concentration of PVP is in a range of 0 to 20 wt %, and the concentration of glycerol is in a range of 5 wt % to 35 wt %. A high silicone concentration results in the ink composition forming a glycerol/PVP-in-silicone emulsion, as designated by (●). Three images of the material having a glycerol/PVP-in-silicone emulsion morphology are depicted below the ternary diagram as indicated by the (●) symbol. The porosity of the formed material is low, and the glycerol/PVP porogen mixture tends to be difficult to rinse away. In addition, the viscosity of the ink composition having region I components tends to be "castable" such that the composition is preferably for casting molds and tends not to be a printable viscosity.

Looking to the ink compositions of region II, the concentration of silicone is in a range of about 15 wt % to about 45 wt %, the concentration of PVP is in a range of 0 to about 15 wt %, and the concentration of glycerol is in a range of 55 wt % to about 75 wt %. The high glycerol concentration relative to the silicone concentration results in the ink composition forming a silicone-in-glycerol/PVP emulsion, as designated by (■). Two images of material having a silicone-in-glycerol/PVP emulsion morphology are depicted below the ternary diagram as indicated by the (■) symbol. The material of these formulations has the highest porosity (having the greatest amount of porogen), however, the structural integrity of the material tends to be compromised. In one approach, at very high porogen concentrations, a silicone-in-porogen emulsion forms in which mostly spheres of silicone are floating in the porogen mixture. As a result, after curing and removing the porogen, the product may have a consistency of a mixture of powder that may not efficiently maintain a shape. For example, as with the components of region I, the viscosity of the ink composition having region III components tends to be "castable" such that the composition is preferably for casting molds and may not have a printable viscosity.

Looking to the ink composition of region III, the concentration of silicone is in a range of about 25 wt % to about 70 wt %, of the total weight of the ink composition, the concentration of PVP is 0 to about 25 wt % of the total weight of the ink composition, and the concentration of glycerol is about 35 wt % to about 60 wt % of the total weight of the ink composition. The relative concentration of silicone and glycerol results in the ink composition forming a desirable bicontinuous, co-continuous, etc. morphology of the material, as designated by (▲). The two middle images of material having a bicontinuous morphology are indicated by the (▲) symbol. The material of these formulations has sufficient porosity as well as structural integrity desired for forming a printable structure. The viscosity of the ink composition having region III components is "printable" and, and thus, may be extruded for 3D printing methods (e.g., DIW).

Looking to the PVP concentration side of the ternary diagram, the effect of PVP on the material is depicted in three images. The top image, as designated by the (▲) symbol shows the highest concentration of PVP, approximately 20 wt % PVP, and the other two images, as designated by the (■) symbol represent material formed with decreasing concentrations of PVP, 10 wt % and 5 wt %, respectively, but the same concentration of glycerol and silicone. The higher concentration of PVP (▲) results in an ink composition having a "printable" viscosity, whereas the lower concentration of PVP (■) results in an ink composition having a "castable" viscosity. Thus, the concentration of PVP may preferably tune the viscosity of the ink composition.

Alternatively, if the PVP concentration is too high in the ink composition, e.g., greater than 30 wt %, then the glycerol/PVP porogen phase is difficult to wash out of the formed material. As the PVP concentration increases, the porogen mixture becomes more and more viscous. In addition, with increased PVP concentrations, smaller size pores containing the glycerol/PVP mixture may be formed, thereby restricting the washing away of the porogen mixture. Thus, increased viscosity and smaller pore size contribute to increased difficulty in washing out the porogen mixture after curing the structure.

FIG. 21 shows a method 2100 of forming a 3D structure including a porous silicone matrix, in accordance with one embodiment. As an option, the present method 2100 may be implemented to construct structures such as those shown in the other FIGS. described herein. Of course, however, this method 2100 and others presented herein may be used to form structures for a wide variety of devices and/or purposes which may or may not be related to the illustrative embodiments listed herein. Further, the methods presented herein may be carried out in any desired environment. Moreover, greater or fewer operations than those shown in FIG. 21 may be included in method 2100, according to various embodiments. It should also be noted that any of the aforementioned features may be used in any of the embodiments described in accordance with the various methods.

Method 2100 begins with step 2102 of forming the three-dimensional structure using a siloxane mixture. In one approach, the silicone mixture includes a vinyl-terminated siloxane macromer and a porogen mixture. In preferred approaches, the porogen mixture includes glycerol and polyvinyl pyrrolidone. In one approach, the forming of the 3D structure may include extruding a continuous filament of the siloxane mixture through a nozzle to form a printed 3D structure having a plurality of continuous filaments arranged in a predefined pattern. In one approach, the predefined pattern may be a geometric pattern, e.g., a log-pile, a mesh, patterned architectures, etc.

In one approach, the forming of a 3D structure includes forming a structure selected from one of the following: a mold, a cast, or a template.

In various approaches, for 3D printing of the ink composition using extrusion-based methodology, the ink composition preferably has shear-thinning behavior. Moreover, the ink composition exhibits a transition from a gel to a liquid at high shear rates. For example, in preferred approaches, the ink composition exhibits an oscillation stress of greater than about 100 pascals (Pa). In addition, in one approach, the gelled state of the extruded ink composition retains its shape to support its own weight during printing, i.e., the extruded structure is self-supporting.

In some approaches, a thixotropic additive may be included to aid in obtaining the correct rheology needed for 3D printing of a self-supporting structure. In one approach, the thixotropic additive may be added to the silicone phase of the ink composition. In another approach, the thixotropic additive may be added to the porogen phase (e.g., glycerol/PVP mixture) of the ink composition. In yet another approach, the thixotropic additive may be added to both the silicone phase and the porogen phase of the ink composition.

In one approach, the siloxane mixture for forming a 3D structure includes a curing agent and a crosslinking agent, as described herein. In some approaches, the siloxane mixture may include an effective amount of an inhibitor for controlling a rate of curing by the curing agent.

In some approaches, the siloxane mixture is an ink composition as described herein. In a preferred approach, a concentration of the siloxane macromer may be in a range of about 25 weight % to about 70 weight % of a total weight of ink composition. In one approach, the siloxane macromer may be a vinyl terminated siloxane macromer as described herein.

In a preferred approach, a concentration of the glycerol may be in a range of about 35 weight % to about 50 weight % of a total weight of the siloxane mixture. In a preferred approach, a concentration of the PVP may be in a range of greater than 0 weight % to about 25 weight % of a total weight of the siloxane mixture. In some approaches, the molecular weight of the PVP portion of the porogen mixture may range from about 10,000 to about 1,300,000 for enabling further tunability of the pore structure of the porous silicone material.

In some approaches, the porogen mixture of the siloxane mixture may include porogen particles. For example, the porogen mixture having glycerol/PVP may also include at least one of the following: urea particles, sugar particles, polyethylene glycol, or a combination thereof.

After forming the 3D structure, step 2104 includes curing the silicone phase of the formed three-dimensional structure to at least a predefined extent to form the silicone matrix. In some approaches, the curing agent may utilize hydrosilylation chemistry during the curing of the 3D structure. In one approach, the curing may occur at an elevated temperature. In one approach, a temperature of the curing may be in a range of about 80° C. to about 120° C. The conditions for curing as described herein are generally understood by one skilled in the art.

After curing the 3D structure to form the silicone matrix, step 2106 includes leaching the porogen mixture from the silicone matrix to result in a plurality of pores forming interconnected channels through the silicone matrix of the 3D structure. In one approach, leaching the porogen mixture includes soaking the 3D structure having the silicone matrix in an aqueous solution to dissolve the porogen mixture. In one approach, the porogen phase (e.g., glycerol/PVP mixture) may be removed from the cured silicone structure by soaking, rinsing, washing, etc. the 3D structure in a water bath. In one approach, the temperature of the water bath for leaching, removing, etc. the porogen phase from the cured silicone structure may be in a range of about 25° C. to about 100° C. for a predefined duration of time. The temperature of the water bath may be at an ambient temperature (e.g., room temperature, about 23° C. to about 25° C.). In one approach, the duration of time to remove the porogen phase from the cured silicone structure may be in a range of about one hour to about 72 hours. At ambient temperatures, the duration of time to remove, leach, etc. the porogen phase from the cured silicone structure may be extended to about 72 hours, whereas at higher temperature, e.g., about 100° C., the duration of time to remove, leach, etc. the porogen phase may be around one hour.

Without wishing to be bound by any theory, it is believed that the gentle washing with warm water to remove the porogen mixture from the 3D structure allows minimal shrinking of the pores formed by the porogen mixture. Moreover, the co-continuous phase morphology of the structure allows substantial removal of the porogen during rinsing, washing, soaking the structure with warm water.

In one approach, a porous silicone matrix having an open cell structure is formed after removing the porogen mixture form the silicone matrix. In one approach, in which the siloxane mixture forms a porogen-in-silicone emulsion, removing the porogen after curing may form a porous silicone matrix having a closed cell structure.

In a preferred approach, the method of forming the 3D structure includes, after removing the porogen mixture, heating the 3D structure of silicone matrix for setting the porous silicone matrix. In one approach, following the removal of the porogen phase from the cured silicone structure, the method of forming a structure having a porous silicone matrix may include a post-cure bake of the structure at a temperature in a range of about 120° C. to about 170° C. for crosslinking the porous silicone matrix. In one approach, the post-cure bake may fully crosslink the porous silicone matrix. In one approach, the structure has a substantially crosslinked silicone matrix.

The method as described herein forms a 3D structure comprised of a silicone matrix having an open pore structure that form continuous channels from one side of the silicone matrix to the opposite side of the silicone matrix. In one approach, the continuous channels form from one side of a continuous filament of the structure to the opposite side of the continuous filament of the structure. In one approach, the continuous channels form from one side of a monolith structure of silicone matrix material to the opposite side of a monolith structure of silicone matrix material.

Experiments

Material and Methods

A poly(diphenylsiloxane-dimethylsiloxane) copolymer (10,000 cSt, ca. 5.5 mole % diphenylsiloxane), PLY3-7560, was obtained from NuSil Technology (Bakersfield, Calif.). Platinumdivinyltetramethyldisiloxane complex (Karstedt's catalyst, low color, ca. 2%) in xylene was supplied by Gelest, Inc (Morrisville, Pa.). (SIP6831.2LC), as were DMS-H11 (hydride terminated PDMS, 10 cSt), HMS-053 (trimethyl terminated [4-6% methylhydrosiloxane] dimethylsiloxane, 1000 cSt), DMS-V05 (divinyl PDMS, 8 cSt), and HMS-H271 (hydride terminated [30% methylhydrosiloxane] dimethylsiloxane copolymer, 60 cSt). 1-ethynyl-1-cyclohexanol (ETCH) was supplied by Sigma-Aldrich (St. Louis, Mo.). Bluesil™ Thixo Add 22646 was supplied by Elkem Silicones (Oslo, Norway). Aerosil® R812S and Sipernat® D13 were supplied by Evonik Industries (Essen, Germany), SIS 6962.1M30 was obtained from Gelest, and Cabosil EH5 was obtained from Cabot Corp (Boston, Mass.). All materials were used as-is without further purification. Formulations were prepared using a Flacktek DAC 150.1 FVZ-K SpeedMixer™ (Landrum, S.C.) for compounding. Catalyst cure temperatures and ink thermal response values were measured using a TA Instruments Discovery DSC (New Castle, Del.) differential scanning calorimeter using Tzero® aluminum sample pans (NDS Surgical Imaging, Sunnyvale, Calif.). Yield stress, viscosity, pot life measurements, and cure profiles were obtained with a TA Instruments AR2000EX rheometer equipped with a cross-hatched 25 mm Peltier parallel plate under a 1 mm sample gap spacing.

Once formulated, all silicone-based inks were filtered (pressurized air, 90 psi) through a Swagelok 140 μm mesh filter (Solon, Ohio) into 30 mL syringe barrels (Nordson EFD Optimum, East Providence, R.I.) and centrifuged (Nordson EFD ProcessMate 5000) to eliminate entrapped air. A flat-ended piston was inserted to seal the rear of the syringe; whereas, the syringe tip was equipped with a smooth-flow tapered nozzle (250 μm inner diameter) via luer-lock. The syringe was attached to a positive-displacement dispenser (Ultra 2800, Nordson EFD), which supplied the appropriate displacement to extrude ink through the nozzle. The syringe system was subsequently affixed to the z-axis of a custom Aerotech air-bearing gantry xy open frame movement stage, which was controlled via an A3200 controller through an Aerotech A3200 CNC operator interface (v5.05.000) (Aerotech Consumer Aerospace, Pittsburgh, Pa. G-code instructions were programmed and run through the controller software to generate continuous FCT lattice structures with a 50% effective density. The lattice structures were printed onto silicon wafers with each layer of parallel filaments being printed orthogonal to the previous layer, yielding an FCT structural arrangement. The printed lattices were cured in a Yamato ADP300C vacuum drying oven (Yamato Scientific America, Inc, Santa Clara, Calif.).

Shore hardness values were obtained by preparing solid "pucks" of silicone material that were cured at 150° C. for 12-16 hours. Durometer values were measured at several different locations with a PTC Instruments Model 408 Type A Durometer (Los Angeles, Calif.). Printed lattice structures were sectioned with a razor blade and cross-sectional images were obtained with a Zeiss SteREO Discovery.V12 microscope (Zeiss, Dublin, Calif.) equipped with an Axiocam ICc 5 camera and analyzed with AxioVision software to measure the diameters of the printed filaments, individual layer heights, and total heights of the printed FCT lattices.

Example Preparation of MD-10A Silicone-Based Ink

A Flacktek Max 100 cup was charged with NuSil PLY3-7560 silicone polymer (24.6 g), platinum catalyst (4 ppm), and inhibitor (ETCH, 400 ppm); the components were mixed with a Flacktek DAC 150.1 FVZ-K SpeedMixer™ at 3500 rpm for 20 seconds. Aerosil® R812S fumed silica (4.2 g) was subsequently added to the mixture and mixed at 3500 rpm for 20 seconds; the sides of the cup were scraped, and the blend was speed-mixed again under the same conditions. Bluesil™ Thixo Additive 22646

TABLE 1

3D printable MD-XA silicone-based ink formulations

| Components | MD-10A | MD-25A | MD-45A | MD-55A | MD-60A | MD-70A |
|---|---|---|---|---|---|---|
| Nusil PLY3-7560 | 82% | 81.20% | 76.50% | 71.50% | 67% | 56% |
| Gelest DMS-V05 | — | — | 0.50% | 3.50% | 5% | 9.50% |

TABLE 1-continued 3D printable MD-XA silicone-based ink formulations

| Components | MD-10A | MD-25A | MD-45A | MD-55A | MD-60A | MD-70A |
|---|---|---|---|---|---|---|
| Karstedt's Catalyst | 4 ppm | 4 ppm | 4 ppm | 4 ppm | 4 ppm | 4 ppm |
| ETCH[a] | 400 ppm | 400 ppm | 400 ppm | 400 ppm | 400 ppm | 400 ppm |
| Aeros ® | 14% | 18% | 12% | 12% | 12% | — |
| Sipernat ® D13 | — | — | 10% | 12% | 15% | 33.50% |
| Bluesil ™ Thixo Additive | 1% | 0.60% | 1% | 1% | 1% | 1% |
| Gelest DMS-H11 | 0.875 eq.[b] | — | — | — | — | — |
| Gelest HMS-H271 | 0.75 eq.[b] | 1 eq.[b] | 2 eq.[b] | 2 eq.[b] | 2 eq.[b] | 2 eq.[b] |
| Shore A Durameter | 10A | 25A | 45A | 55A | 60A | 70A |

[a]1-ethyny-1-cyclohexanol
[b]Equivalents per each equivalent reactive vinyl group within each formulation (0.3 g) was added to the mixture, followed by speed-mixing at 3500 rpm for 20 seconds. Lastly, Gelest HMS-H271 (0.221 g) and Gelest DMS-H11 (0.644 g) were added and speed mixed into the blend at 3500 rpm for 20 seconds. The sides of the cup were scraped, and the dispersion blend was speed-mixed again under the same conditions, yielding a viscous translucent polysiloxane ink.

As shown in Table 1, a 3D printable silicone-based ink was prepared with a reduced silica filler loading (14 wt. % HMDZ-treated silica) and cured using 0.75 equivalents (hydride:vinyl) of a dihydride chain extender and 0.75 equivalents of silane crosslinker, which was sufficient to decrease the measured durometer to Shore 10A, (named "modified durometer 10A" or MD-10A).

Evidence of Pseudoplasticity

Analysis of shape retention behavior may be used to evaluate the relationship between properties of silicone-based ink materials. In brief, using a model of Hershel-Bulkley material moving through a cylindrical nozzle, an extruded core material having properties characteristic of an unyielded silicone-based ink based may be subjected to beam deflection analysis. Equation 1 shows the relationship of the elastic behavior of an ink to a desired beam deflection, in which γ represents the specific weight of an ink and s represents the beam length (L) to strand diameter (D) ratio, L/D.

$$G' \geq 1.4\ \gamma s^4 D \quad \text{Equation 1}$$

According to Equation 1, the 3D printable silicone-based inks may possess G' values several orders of magnitude higher than that recommended for a strand deflection of ≤0.05D. Thus, in some approaches, the deposition speed may be tuned to print lower G' inks for 3D printed architectures. Moreover, in come approaches, custom silicone-based ink formulations may support higher density fillers for 3D printed architectures.

FIG. 3A shows the oscillatory stress (Pa, x-axis) of storage modulus (G', y-axis) values for silicone-based inks containing various levels of rheological additive. Yield stress was defined as the oscillatory stress corresponding to 90% of the storage modulus plateau. Increasing the rheological additive content led to an increase in ink yield stress to 410 Pa for an ink containing 0.25 wt. % of a rheological additive (●), 515 Pa for 0.50 wt. % of a rheological additive (▲), and 540 Pa for 1.0 wt. % of a rheological additive (▼) as the degree of pseudoplasticity increased. In the absence of a rheological modifier (■), no pseudoplasticity was observed; instead, the measured storage modulus (G') was always less than that of the loss modulus (G"). However, when the rheological additive was added in the presence of treated silica filler, a highly pseudoplastic material with a large yield stress was obtained.

FIGS. 3B and 3C show a lattice 8-layer structure formed by 3D printing with a silicone-based ink with 1.0 wt. % rheological additive (FIG. 3B) and with silicone-based ink without rheological additive (G">G') (FIG. 3C). Mechanistically, without wishing to be bound by any theory, it is believed the pseudoplasticity was due to the formation of a stable three-dimensional network between silica filler particles and the rheological additive via hydrogen bonding and potential van der Waals interactions.

FIG. 3D is a plot of the effect of treated reinforcing silica filler (with a constant 1.0 wt. % rheological additive) on the observed yield stress of DIW inks. At a rheological additive concentration of 1.0 wt. %, loading of increasing concentrations of treated silica were studied to determine the appropriate quantity of silica necessary to print soft 3D materials. Oscillatory rheology was performed, demonstrating that at a relatively low loading of HMDZ-treated silica (10 wt. %, ■), the measured yield stress was 130 Pa, a value deemed too low for our 3D printing processes; yield stress values increased to 400 Pa, 545 Pa, and 690 Pa for silicone-based formulations comprising, 15 wt. % (□), 18 wt. % (▲), and 20 wt. % (*) HMDZ-treated silica, respectively. Thus, it was demonstrated that the rheology of the ink formulations may be tuned through an adjustment in silica loading.

Pt-Catalyzed Hydrosilylation Chemistry

A low color Karstedt Pt catalyst was selected as a platinum catalyst complex and 1-ethynyl-1-cyclohexanol (ETCH) was selected as the reaction inhibitor. To obtain inks with a long printable time windows, 300-400 ppm ETCH was added for 4-5 ppm Pt catalyst to sufficiently inhibit silicone curing while still providing rapid curing at elevated temperatures (ca. 125-150° C.).

Figure 4:
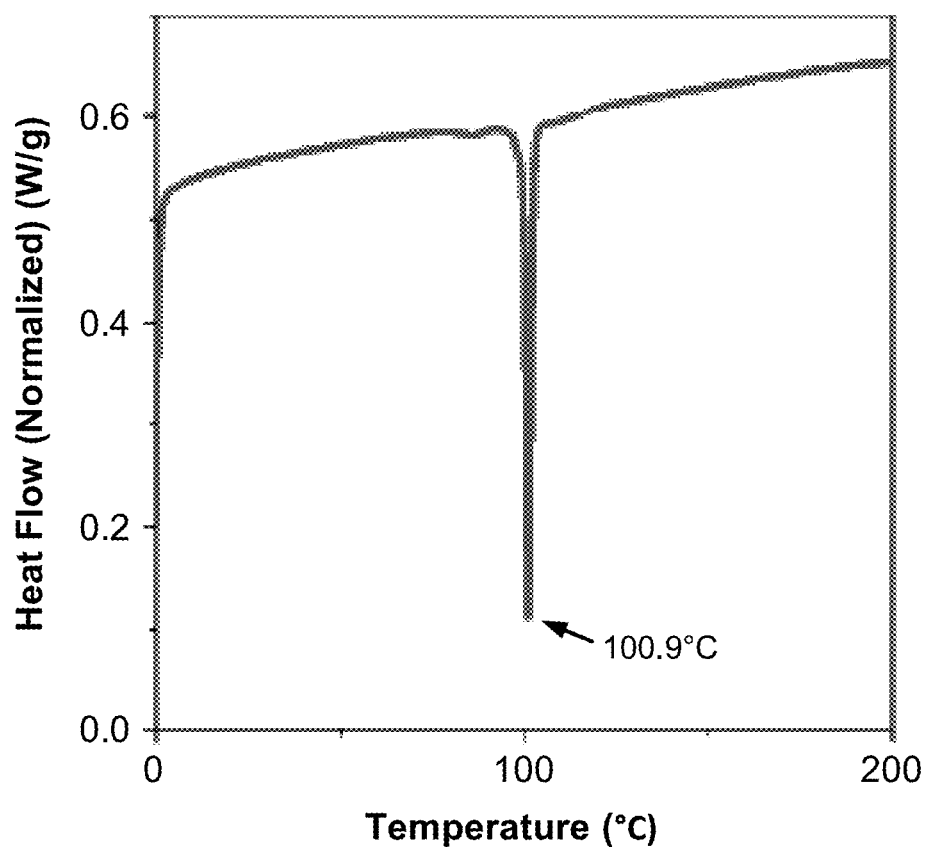
FIG. 4 is a plot of a normalized temperature sweep for a polysiloxane matrix, according to one embodiment.

FIG. 4 shows a normalized temperature sweep (x-axis) for a polysiloxane matrix containing 4 ppm Pt-Karstedt's catalyst and 500 ppm ETCH inhibitor in which the normalized heat flow of the polysiloxane matrix was measured (y-axis, W/g). As shown in FIG. 2, the onset of curing is indicated by the endothermic peak at 100.9° C.

Figure 5:
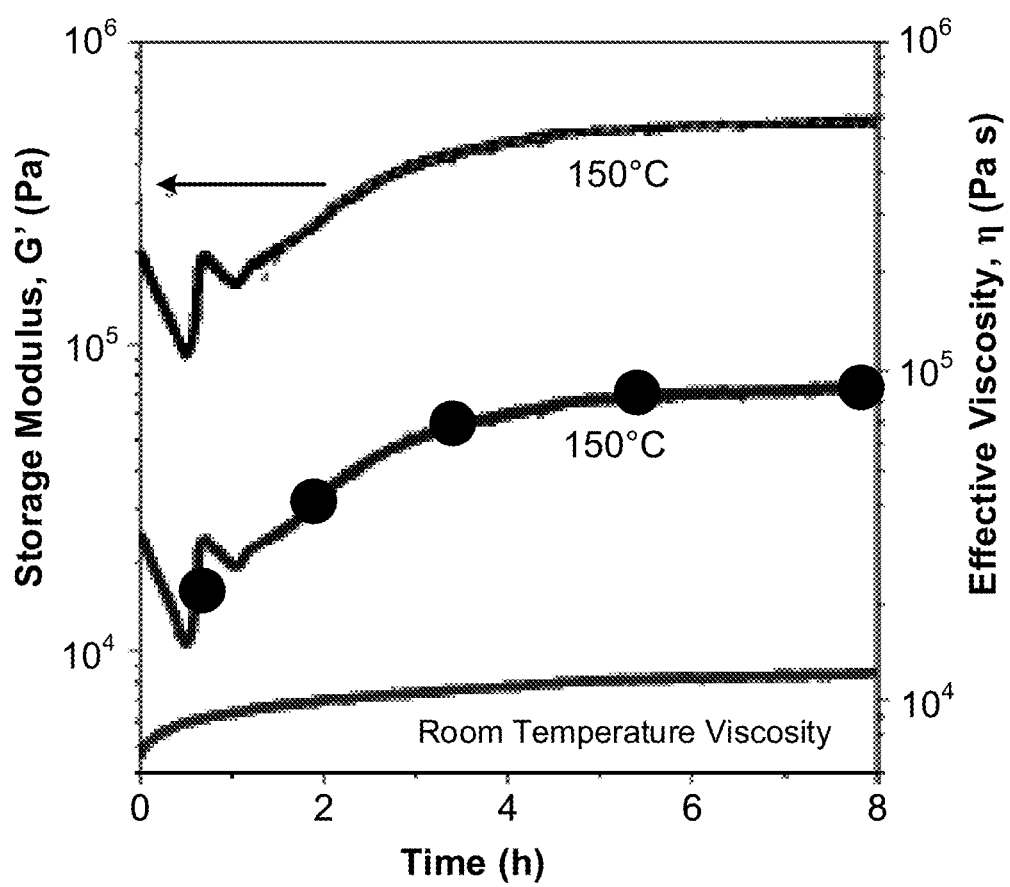
FIG. 5 is a plot of the oscillatory rheology of silicone-based inks at variable temperatures, according to one embodiment.

To analyze the working print time, a 3D printable silicone-based composite was prepared in the presence of 4 ppm Pt-Karstedt's catalyst, 400 ppm ETCH, and 1.0 equivalent of silane crosslinker. FIG. 5 shows the oscillatory rheology a 3D printable silicone-based composite at room temperature and at 150° C. over time, 0 to 8 hours (x-axis). From this analysis, the effective viscosity (right y-axis) of the silane-based composite remained stable with low viscosity and long pot life at room temperature for greater than 8 hours (bottom curve), whereas at 150° C., the effective viscosity curve (●) showed curing with a dramatic rise in viscosity could be initiated within the first hour of elevated temperature. Analysis of the storage modulus (left y-axis), showed a similar dramatic patterned curve at 150° C. (uppermost curve). Thus, this analysis showed printing with silicone-based inks as described may be stored over 24 hours after preparation; and storing inks in a cold environment may further prolong the pot life.

Figure 6B:
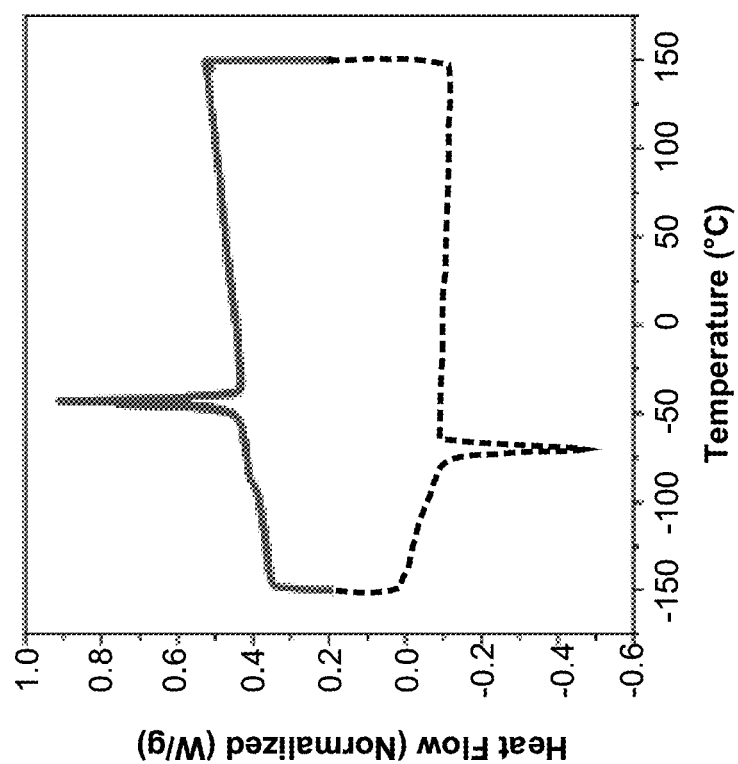
FIG. 6B is the DSC heating profile curves of standard PDMS material, according to one embodiment.
Figure 6A:
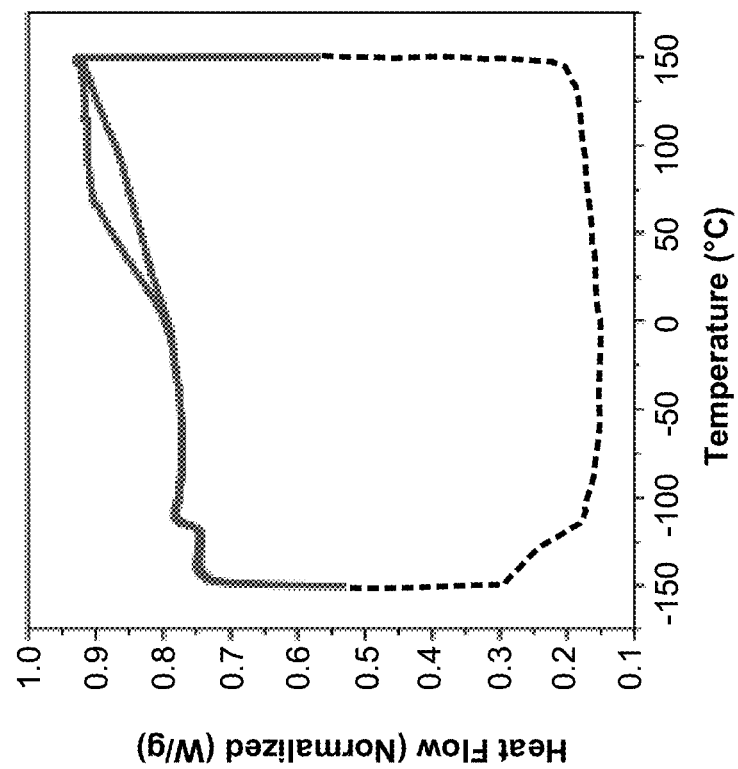
FIG. 6A is the DSC heating profile curves of silicone-based ink, according to one embodiment.

Silicone-Based Inks with Tunable Stiffness 3D printable silicone-based inks were prepared following Shore hardness durometer values 10A, 25A, 45A, 55A, 60A, and 70A, which were named MD-XXA, where XX corresponds to the Shore hardness. The complete formulation details for each material is shown on Table 1 (see above). FIGS. 6A and 6B show the DSC heating profiles for standard PDMS material (FIG. 6B) and polysiloxane ink MD-70A (FIG. 6A). The DSC heating profile involved a temperature ramp (solid curve) from −150° C. to 150° C. at a rate of 10° C. ° C./minute, followed by an isothermal hold for 1 minute and a cooling ramp (dashed curve) from 150 to −150° C. at a rate of 10° C./minute, followed by an isothermal hold for 1 min prior to a final temperature ramp (solid curve) from −150° C. to 150° C. at a rate of 10° C./minute.

FIG. 6B depicts the normalized DSC curve for a standard PDMS material, showing characteristic crystallization peak (dashed curve) and melting peak (solid curve). In contrast, FIG. 6A shows a normalized DSC curve for a characteristic variable stiffness polysiloxane ink (MD-70A) demonstrating the absence of crystallinity in the MD-70 material as a result of the use of the poly(dimethylsiloxane)-co-(diphenylsiloxane) macromer.

3D Printed Structures from Silicone-Based Ink

Figure 7B:
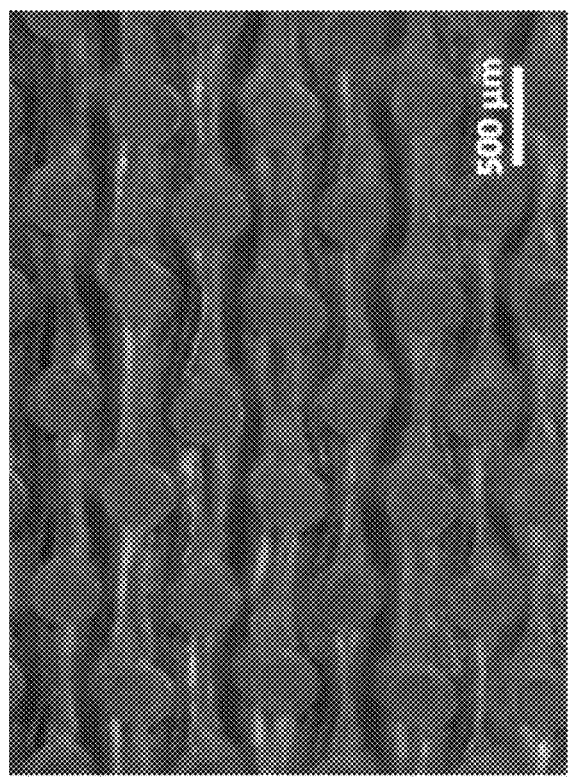
FIG. 7A-7B are cross-sectional images of lattice structures of silicone-based inks, according to various embodiments.
Figure 7A:
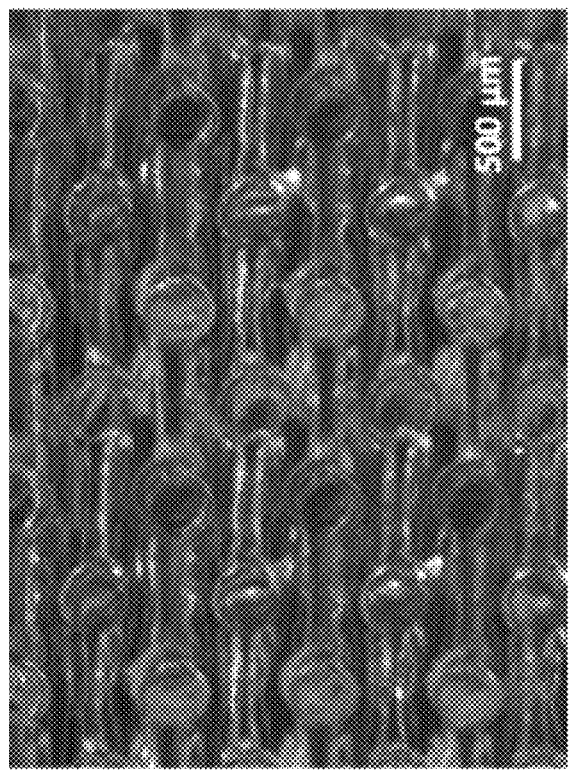

A representative cross-sectional image of lattice structures from 3D printing with silicone-based ink MD-10A is shown in FIG. 7A and with silicone-based ink MD-70A is shown in FIG. 7B. Each structure resulted in 28 printed layers with an FCT (face centered tetragonal) geometry, 1000 μm center-to-center spacing, and a 250 μm filament diameter.

Stiffness Tunability of Silicone-Based Ink for 3D Printing

Tensile and compression testing of silicone-based ink demonstrated stiffness tunability. FIGS. 8A-8D show the tensile and compression results for silicone-based inks MD-10A, MD-45A, and MD-70A. FIG. 8A shows a plot of tensile stress (y-axis) versus tensile strain (x-axis) of silicone-based inks MD-70D (■), MD-45A (●), and MD-10A (solid black line). The softest material, MD-10A, featured a Young's modulus of 0.40 MPa with an average elongation at break of 528%. MD-45A (●) featured a Young's modulus of 3.61 MPa with an average elongation at break 362%. The hardest material, MD-70A (■) featured a Young's modulus of 11.51 MPa with an average elongation at break of 77%.

The relative compressive performance of the silicone-based inks was measured by applying a cyclic compressive load of 2000 kPa to an 8 layer FCT lattice (500 μm center-to-center spacing, 250 μm filament diameter). FIG. 8B shows a summary of the compressive load deflection curves and peak compressive strain values of 59.2%, 56.6%, and 48.1% were measured after 3 successive load-unload cycles for MD-10A (solid line), MD-45A (●), and MD-70A (■), respectively. These results demonstrated hysteresis with regard to stable cyclic compressive loads.

A physical demonstration of the large difference in material properties at either end of the hardness spectrum is shown in FIGS. 8C and 8D. Observable variable stiffness of 3D printed silicone lattices evident through compression loading with 1200 g static weighted samples for MD-10A (FIG. 8C) and MD-70A (FIG. 8D).

FIG. 8E depicts the demonstration of the potential for soft robotic applications through the printing of a pneumatically-driven gripper comprised solely of MD-10A and MD-70A. An air-driven soft robotic actuator was 3D printed as a single component. Pressurization of the hollow interior channels comprising soft silicone (MD-10A) exhibiting high strength and low stiffness were able to expand and deflect the reinforcing frame of the actuator, which was printed with a stiff silicone material (MD-70A). Various forms of bio-inspired locomotion and bio-mimicry in the form of soft robotics applications could thus be engineered in a similar fashion.

Preparation of Porogen Particles

In the following experiments, urea particles were prepared to be used as porogen particles. Urea particles (Sigma Aldrich Corp., St. Louis, Mo.) were melted and extruded using a capillary rheometer (Malvern Panalytical, Malvern, UK, RH10, Advanced Capillary Rheometer) using a left bore (0.25 mm diameter die with a length of 4 mm and flat entrance) and a right bore (0.25 mm diameter die with a length of 0.25 mm and flat entrance). Bore temperature for melting and extruding the urea was 140° C. Urea particles were collected in a 1 cSt silicone oil solution to cool the urea melt droplets, forming discrete solid spherical particles upon contact in the oil. Increasing the extrusion speed resulted in the generation of smaller particles.

Characterization of Extruded Urea Particles

Using a Morphologi G3 system (Malvern Panalytical, Malvern, UK), average values of diameter and circularity for urea particles were determined from extrusion at variable shear rates as listed in Table 2. Increased extrusion rates resulted in urea particles with a smaller mean diameter.

Batches of urea particles were sieved to remove undesired particle size for ink. A Gilson ROTAP Sieve Shaker (RX-29, Gilson Company, Inc., St. Louis, Ohio) with

TABLE 2

Characterization of Urea Particles at different Extrusion Shear Rates

| Sample No. | Extrusion Rate (mm/min) | CE Diameter Mean (μm) | CE Diameter D[4,3] Mean (μm) | Circularity Mean | No. Particles Counted |
|---|---|---|---|---|---|
| 1 | 600 | 21.86 | 330.10 | 0.960 | 164876 |
| 2 | 890 | 17.64 | 155.90 | 0.948 | 506519 |
| 3 | 1000 | 17.07 | 107.00 | 0.934 | 324834 |
| 4 | 1100 | 16.65 | 95.93 | 0.942 | 555545 |
| 5 | 1200 | 11.64 | 92.99 | 0.940 | 481018 | a top sieve (63 μm) and bottom sieve (45 μm) was used to obtain urea particles of desired size.

FIG. 11 depicts the characterization of urea particles after sieving. Part (a) is a plot of the number distribution of urea particles according to a mean CE diameter. The mean CE diameter of the majority of sieved urea particles is 13.26 μm. Part (b) is a plot of the volume distribution (D[4,3]) of sieved urea particles according to mean CE diameter. The mean CE diameter (D[4,3]) of the majority of sieved urea particles is 50.41 µm. Part (c) is a plot of the circularity of the sieved urea particles. Nearly the sieved urea particles have a circularity mean of 0.903, with a majority of the particles having a circularity greater than 0.95.

3D Printing with Siloxane Ink Including Urea Particles

The amount of urea particles mixed with the siloxane formulation, as described herein, determined a desired porosity of the final printed structure. In one experiment, 54.5 wt % of urea particles to total siloxane ink was used to form a 3D printed siloxane structure.

FIG. 12 illustrates a yield stress plot of siloxane resin with and without urea particles. The storage modulus, G,' of the inks as measured on the left y-axis shows the siloxane resin with urea particles (■) has a similar curve as the siloxane resin without urea particles (□). The loss modulus, G," of the inks as measured on the right y-axis shows the siloxane resin with urea particles (■) has a similar curve pattern as the siloxane resin without urea particles (○). The cross-over point between G' and G" of the siloxane resin with urea particles is about 520 Pa, and the cross-over point of the siloxane resin without urea particles is about 174 Pa.

A 3D printed structure was formed as a face centered tetragonal (FCT) structure having seven layers and a porosity of 20 vol % using a 250 µm nozzle to extrude the siloxane ink having urea particles onto a substrate. The 3D printed structure had a 375 µm road width and a 225 µm layer height. The 3D printed siloxane structure was cured using a temperature ramp from 0° C. to 100° C., and a cure at 100° C. for 12 hours.

FIGS. 13A and 13B show SEM images of a cured 3D printed structure of siloxane with spherical urea particles. FIG. 13A is an image of a cross section of the 3D printed structure showing the inside of the filaments where the siloxane material has a plurality of urea particles. FIG. 13B is an image of a top down view of the 3D printed structure showing uniform filaments of the siloxane material with urea particles on the surface of the filaments.

The urea particles were removed from the 3D printed siloxane structure by exposing the printed structure to water. The structures were placed in heated deionized (DI) water at 80° C. for about three hours. As shown in Table 3, removal analysis determined that all the urea particles were leached from the FCT 7-layered, 54.5 wt % urea-loaded structure by 3 hours of water exposure as measured by weight loss.

Following the leaching of the urea particles, the 3D printed siloxane structures were post-cured at 150° C. for 10 hours to allow the material to fully cross-link and dry the 3D printed structure. The images of the 3D printed porous siloxane structure in FIGS. 9A and 9B depict the structure following leaching of the urea particles and drying.

Measurements of the filaments of the 3D printed structures before and after leaching were performed using ImageJ computer software (open platform) by comparing measurements from the SEM images of FIGS. 13A and 13B and FIGS. 9A and 9B, respectively. The analysis demonstrated that in one example, and not meant to be limiting in any way, a filament diameter of the structure before leaching (after pre-cure) had a mean measurement 232.56±9.03 µm and a filament diameter of the structure after leaching (and post-cure) had a mean measurement of 182.42±9.34 µm, thereby resulting in an estimated 21.56% shrinkage of the filament following leaching.

Different Volumetric Loading of Porogen Particles in Ink for 3D Printing

The scanning electron microscope (SEM) images shown in FIGS. 14A and 14B represent printed siloxane structures generated with inks having different volume loadings of the porogen material. By using a low volume loading of the porogen particles, such as the 25 vol % presented in image in FIG. 14A, a closed cell network can be created inside the printed filaments. By having a high porogen loading on the formulated ink, pores start to connect inside the printed filaments forming open cell networks, such as the 70 vol % presented in image in FIG. 14B.

Porogen Morphology in the 3D Printed Part

FIGS. 15A and 15B show SEM images of 3D printed filaments using urea particles as the porogen material in a siloxane ink. FIG. 15A is an image of a structure having pores formed with urea particles having a spherical shape. FIG. 15B is an image of a structure having pores formed with urea particles having a smaller, elongated shape.

Porogen Particles in 3D Siloxane Inks

The SEM images of FIG. 16 depict a siloxane 3D printed structure formed by DIW with a siloxane ink having sugar particles used as porogen particles. Part (a) represents an image the geometric shape of the 3D printed structure having pores shaped from sugar particles. Part (b) is an image of a magnified view of a filament of the 3D printed structure in the image of part (a). Part (c) is an image of a magnified view of a pore of the filament from the image of part (b). Part (d) is an image of a magnified view of the inside of the pore from the image of part (c).

SEM images of FIG. 17 depict a siloxane 3D printed structure formed by DIW with a siloxane ink having polyethylene glycol (PEG) particles used as porogen particles. Part (a) represents an image the geometric shape of the 3D

TABLE 3

Analysis of Urea Removed from 3D Printed Structure During Water Exposure

| Sample | Exposure Time to water (hh:mm:ss) | Urea present post-cure (g) | Weight loss during leaching (g) | Wt % of area present after leaching |
|---|---|---|---|---|
| 1 | 0:15:00 | 0.247 | 0.144 | 41.80 |
| 2 | 0:30:00 | 0.292 | 0.192 | 34.31 |
| 3 | 0:45:00 | 0.286 | 0.194 | 32.29 |
| 4 | 1:00:00 | 0.267 | 0.236 | 11.76 |
| 5 | 1:30:00 | 0.251 | 0.247 | 1.30 |
| 6 | 2:00:00 | 0.258 | 0.254 | 1.87 |
| 7 | 3:00:00 | 0.281 | 0.285 | −1.18 |
| 8 | 4:00:00 | 0.266 | 0.273 | −2.69 |
| 9 | 6:00:00 | 0.261 | 0.269 | −3.33 |
| 10 | 8:00:00 | 0.292 | 0.303 | −3.42 |
| 11 | 8:00:00 | 0.258 | 0.266 | −3.10 | printed structure having pores shaped from PEG particles. Part (b) is an image of a magnified view of a filament of the 3D printed structure of part (a). Part (c) is an image of a magnified view of a portion of filament having pores from part (b). Part (d) is an image of a magnified view of the portion from part (c).

SEM images of FIGS. 18A-18F depict a siloxane 3D printed structure formed by DIW with a siloxane ink having a mixture of urea particles and glycerol used as porogen particles. FIGS. 18A-18C are images taken at different magnifications of a printed structure before removing the porogen particles. FIGS. 18D-18F are images taken at different magnifications of the printed structure after removing the porogen.

Pore Morphology Using PVP/Glycerol Porogen Mixture

FIGS. 22A-22D depict scanning electron microscope (SEM) images of a porous silicone matrix formed with a PVP/glycerol porogen mixture as described herein. FIG. 22A is an image of a non-aged porous silicone matrix and FIG. 22B is a magnified view of a portion of the image of FIG. 22A. For the non-aged porous silicone matrix, the curing procedure is performed immediately after forming the mixture. For comparison, FIG. 22C is an image of an aged porous silicone matrix and FIG. 22D is a magnified view of a portion of the image of FIG. 22C. The aged porous silicone matrix was kept at room temperature over the course of a week prior to performing the curing procedure. Aging does not adversely affect the intra-filament pores of the silicone matrix with minimal shrinkage and/or collapsing of the pores.

FIG. 22E is a plot of a normalized distribution (y-axis) of pores having a certain characteristic length (x-axis) in the of the non-aged porous silicone matrix (solid line) and aged porous silicone matrix (●). As shown, the aged porous silicone matrix had a slightly larger distribution of pores between 15 to 20 µm in length compared to non-aged porous silicone matrix having a similar distribution of pores between 10 and 15 µm in length.

In Use

Functional 3D printed soft materials have a diverse range of applications and potential within the fields of materials engineering, bioengineering, and electronics. Through precise control over the deposition of highly-engineered viscoelastic inks in the form of continuous filaments, complex 3D architectures may be additively fabricated, layer-by-layer, to generate parts that are directly applicable to cutting-edge technologies, including aerospace and defense, microwave optics, supercapacitors, piezoelectrics, and mechanical metamaterials. In particular, 3D printed silicones may be well suited to soft materials applications including high-performance foams and cellular-solids, soft robots, biomedical devices and biological scaffolds, and flexible and stretchable electronics. It would be desirable to tune silicone-based printable material to form 3D printed silicone structures variable stiffness.

Some embodiments as described herein may be used as an alternative for printing 3D structures with open and closed pore networks. In some approaches, the 3D printed siloxane structures may be useful for 3D printed clothing.

Various embodiments described herein may be applied to 3D engineered cellular solids, foam structures, shock-absorbing cushions, soft robotics, biomedical devices (biocompatibility), prosthetics, metamaterials, flexible electronics, and optic systems. Additionally, the low temperature performance, up to negative 100° C., may be suitable to applications in extreme conditions such as space.

Various embodiments described herein may be used for elastomeric foams for energy absorption, insoles, helmets, acoustic insulators, medical applications, etc.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments but should be defined only in accordance with the following claims and their equivalents.

What is claimed is:

1. A method of forming a three-dimensional structure comprising a porous silicone matrix, the method comprising:
   forming the three-dimensional structure using a siloxane mixture, the siloxane mixture comprising a siloxane macromer and a porogen mixture comprising glycerol and polyvinyl pyrrolidone;
   curing the formed three-dimensional structure to at least a predefined crosslink density to form a silicone matrix; and
   leaching the porogen mixture from the silicone matrix to result in a plurality of pores forming interconnected channels through the silicone matrix of the three-dimensional structure.

2. The method as recited in claim 1, wherein forming the three-dimensional structure includes extruding a continuous filament of the siloxane mixture through a nozzle to form a printed three-dimensional structure having a plurality of continuous filaments arranged in a predefined pattern.

3. The method as recited in claim 1, wherein the forming the three-dimensional structure includes forming a structure selected from the group consisting of: a mold, a cast, and a template.

4. The method as recited in claim 1, wherein the siloxane mixture includes a curing agent and a crosslinking agent.

5. The method as recited in claim 4, wherein the siloxane mixture includes an effective amount of an inhibitor for controlling a rate of curing by the curing agent.

6. The method as recited in claim 1, wherein a concentration of the siloxane macromer is in a range of about 25 weight % to about 70 weight % of a total weight of the siloxane mixture.

7. The method as recited in claim 1, wherein a concentration of the glycerol is in a range of about 35 weight % to about 50 weight % of a total weight of the siloxane mixture.

8. The method as recited in claim 1, wherein a concentration of the glycerol is in a range of greater than 0 weight % to about 25 weight % of a total weight of the siloxane mixture.

9. The method as recited in claim 1, wherein leaching the porogen mixture comprises soaking the three-dimensional structure having the silicone matrix in an aqueous solution to dissolve the porogen mixture.

10. The method as recited in claim 1, further comprising, heating the three-dimensional structure having the silicone matrix for setting the silicone matrix.

11. The method as recited in claim 1, wherein the porogen mixture further comprises particles selected from the group consisting of: urea particles, sugar particles, polyethylene glycol, and a combination thereof.

12. The method as recited in claim 1, wherein the porous silicone matrix has an open cell structure.

13. The method as recited in claim 1, wherein the predefined crosslink density is selected according to a formulation of the siloxane mixture.

14. A product formed by the method of claim 1, the product comprising:
a three-dimensional printed structure comprising the silicone matrix having the predefined crosslink density, wherein the three-dimensional structure comprises:
a plurality of continuous filaments arranged in a predefined pattern, the continuous filaments each comprising a silicone matrix having an open cell structure with a plurality of intra-filament pores, wherein the intra-filament pores form continuous channels through the silicone matrix; and
a plurality of inter-filament pores, wherein the inter-filament pores are defined by the predefined pattern of the continuous filaments.

15. The product as recited in claim 14, wherein the silicone matrix includes vinyl terminated siloxane polymers.

16. The product as recited in claim 14, wherein the continuous filaments have an average diameter greater than about 100 microns.

17. The product as recited in claim 14, wherein the inter-filament pores are interconnected from a surface of the three-dimensional printed structure to a surface on an opposite side of the three-dimensional printed structure.

18. The method as recited in claim 1, wherein the siloxane mixture includes an additive for achieving the predefined crosslink density.

19. The method as recited in claim 18, wherein the additive is configured to cause reduction in an effective crosslink density of the silicone matrix.

20. The method as recited in claim 19, wherein the additive comprises a hydride terminated chain extension additive.

21. The method as recited in claim 18, wherein the additive is configured to cause an increase in an effective crosslink density of the silicone matrix.

22. The method as recited in claim 21, wherein the additive comprises a vinyl-containing additive.

* * * * *